United States Patent
Bjarklev et al.

(10) Patent No.: US 7,062,140 B2
(45) Date of Patent: Jun. 13, 2006

(54) COMPOSITE MATERIAL PHOTONIC CRYSTAL FIBRES, METHOD OF PRODUCTION AND ITS USE

(75) Inventors: Anders Bjarklev, Roskilde (DK); Thorkild Sorensen, Kobenhavn NV (DK); Jes Broeng, Birkerod (DK)

(73) Assignee: Crystal Fibre A/S, Birkerod (DK)

( * ) Notice: Subject to any disclaimer, the term of this patent is extended or adjusted under 35 U.S.C. 154(b) by 49 days.

(21) Appl. No.: 10/793,327

(22) Filed: Mar. 5, 2004

(65) Prior Publication Data

US 2005/0111804 A1    May 26, 2005

(30) Foreign Application Priority Data

Mar. 7, 2003    (DK) ............................... 2003 00351

(51) Int. Cl.
*G02B 6/32* (2006.01)
(52) U.S. Cl. ......................... 385/125; 385/126
(58) Field of Classification Search ................. 385/125
See application file for complete search history.

(56) References Cited

U.S. PATENT DOCUMENTS

| | | | |
|---|---|---|---|
| 5,907,647 A | 5/1999 | Eggleton et al. | |
| 2003/0169987 A1* | 9/2003 | Eggleton et al. | 385/125 |
| 2004/0151450 A1* | 8/2004 | Wadsworth et al. | 385/123 |
| 2004/0233458 A1* | 11/2004 | Frick | 356/480 |

OTHER PUBLICATIONS

Joannopoulos et al., "Photonic Crystals: Molding the Flow of Light", Princeton University Press, 1995 (Abstract only).
Broeng et al., "Photonic Crystal Fibers: A New Class of Optical Waveguides", Optical Fiber Technology, vol. 5, pp. 305-330, 1999.
Fedotov et al., "Tuning the Photonic Band Gap of Sub-500-nm-Pitch Holey Fibers in the 930-1030-nm Range", Laser Physics, 2000. V.10.No. 5. p. 1086-1088.
T.M. Munro et al., "Chalcogenide Holey Fibres", IEE Electronics Letters, vol. 36, No. 24, Nov. 2000.

(Continued)

*Primary Examiner*—Sung Pak
(74) *Attorney, Agent, or Firm*—Jacobson Holman PLLC

(57) ABSTRACT

An optical fibre for transmission of light at a predetermined wavelength, the fibre having a core region, an inner cladding region and an outer cladding region, the inner cladding region having spaced apart voids, at least some of which are at least partly filled with a fluid substance to modify a refractive index in the cross-section of the fibre. The fluid substance may be introduced by preparing and fixing the fibre ends, identifying the voids to be filled and infusing the fluid therein while masking openings in the remaining voids. By selective heating of parts of the fibre, the location of the fluid substance in the void may be controlled to extend over only a fraction of the length of a void that extends the length by the fibre.

22 Claims, 22 Drawing Sheets

OTHER PUBLICATIONS

Zheltikov et al., "Controlled Light Localization and Nonlinear-Optical . . . ", Journal of Experimental and Theoretical Physics vol. 93(3) pp. 499-509. Sep. 2001 (Abstract only).

A. Argyros et al., "Ring Structures in Microstructured Polymer Optical Fibres", Optics Express, vol. 9, No. 13, Dec. 2001, pp. 813-820.

Eggleton et al., "Microstructured Optical Fiber Devices", Optics Express, vol. 9, No. 13, Dec. 2001, pp. 698-713.

Bjarklev, Broeng, and Bjarklev "Photonic Crystal Fibres", Kluwer Academic Publishers, Sep. 2003 (Abstract only).

* cited by examiner (401) (402) (403)

(2001) (2002) (2003) (2004) (2005) (2006)

(2101)　(2102)　(2103)　(2104)　(2105)　(2101)

(2201)　(2202)　(2203)　(2204)　(2205)

COMPOSITE MATERIAL PHOTONIC CRYSTAL FIBRES, METHOD OF PRODUCTION AND ITS USE

FIELD OF INVENTION

The present invention relates to optical microstructured photonic crystal waveguides, especially for use in optical fibres that provide enhanced waveguide properties through the use of combinations of different materials in microstructured photonic crystal waveguides.

BACKGROUND OF THE INVENTION

Within the past few years, a new type of optical fibre that is characterized by a so-called microstructure has received a large interest within the area of optical waveguide research. Optical fibres of this type (which are referred to by several names—e.g., microstructured fibres, photonic crystal fibres, holey fibres, or photonic bandgap fibres) have been described in a number of references, see e.g. Bjarklev, Broeng, and Bjarklev "Photonic crystal fibres", Kluwer Academic Publishers, 2003. This invention concerns fibres of all types, including those guiding by M-TIR and those fibres guiding by the PBG effect.

Most of the photonic crystal fibres fabricated today are made of silica glass with a number of air-filled holes placed parallel to the fibre axis and extending in the full length of the optical fibre. It should also be noted that few examples of photonic crystal fibres fabricated of other glass types (see e.g., T. M. Monro et al. IEE Electronics Letters, Vol. 36, No. 24, November 2000 for chalcogenide glasses) or polymers (see e.g., A. Argyros et al., Optics Express, Vol. 9, No. 13, December 2001, pp. 813–820) have been reported.

Waveguiding properties of present optical crystal fibre waveguides are limited to properties which can be achieved with silica-based optical waveguides, e.g. wavelength dependent waveguiding properties limited by light attenuation, i.e. light absorption and light scattering.

Thus there is a need for photonic crystal fibres having properties that are not limited to silica.

The idea of applying materials other than silica (or a combination of different material systems) is that it may allow for an even wider range of optical properties to be obtained, e.g., wider (or even new) transmission windows, or different non-linear coefficients—just to mention a few.

It is an object of the present invention to seek to provide improved microstructured photonic crystal waveguides.

It is also an object of this application to describe a class of such new components.

It should be noted that although the present invention is described by analogy to silica-based photonic crystal fibres, it is not limited thereto, as fibres having other base materials also may be used according to the invention.

An interesting possibility concerning the development of new material combinations in relation to photonic crystal fibres is described in the patent application U.S. Pat. No. 5,907,647 entitled "Long-period grating switches and devices using them" by Eggleton et al. This invention describes means to obtain an optical switch by employing a long-period fibre grating for switching light between alternative optical paths. The fundamental elements of the device comprise a variable intensity light source, a length of optical waveguide dimensioned for co-propagating light in two distinguishable modes, and a long-period grating in the waveguide for coupling between the two modes. The waveguide is non-linear so that the effective refractive index is a function of intensity, and as a consequence, the coupling produced by the grating is a function of intensity, and different levels of light intensity can switch between the separate modes of the fibre waveguide. In the description by Eggleton et al., examples of the non-linear function of the waveguide such as glass (possibly doped with telluride or selenide) at sufficiently high intensities or other materials such as semiconductors or organic layered materials are mentioned. An advantage of the invention described in U.S. Pat. No. 5,907,647 is that the signal source and the control source can have the same or different wavelengths, and they can pass through the waveguide in the same or different directions. It is, however, a disadvantage that the devices described by the invention of Eggleton et al. require the inclusion of a long-period waveguide grating, and it is described how coupling between modes of the waveguide may be avoided in the absence of the long-period grating.

Another relevant contribution to the field of photonic crystal fibres (or micro-structured fibres) is described in work by Eggleton and co-workers, see e.g., Optics Express, Vol. 9, No. 13, December 2001, pp. 698–713. In these applications, the micro-structured cladding region is designed to manipulate the propagation of core and leaky cladding modes. The core can incorporate a doped region allowing for the inscription of grating structures, and the air holes can allow for the infusion of active materials yielding novel tuneable hybrid waveguide devices. The resulting hybrid waveguide can be exploited in the design of optical devices such as grating-based filters, tuneable optical filters, tapered fibre devices, and variable optical attenuators. In the tuneable devices described by Eggleton et al., a so-called "grapefruit" micro-structured optical fibre, having six large (about 30–40 micron in diameter) air holes surrounding an inner cladding region of ~30 microns in diameter. In order to obtain tuneable optical fibre waveguides, Eggleton et al. introduce a polymer (an acrylate monomer mixture) into the six air holes surrounding the core, where after it is UV-cured. The refractive index of the polymer has higher temperature dependence than that of the glass, and since the fundamental mode is not affected by the presence of the air holes, mode guiding in the cladding can be strongly affected by changing the hybrid waveguide temperature by 10–50° C.

It is a problem that the polymer materials that are immersed in the air holes of the fibre devices described by Eggleton have a relatively high viscosity, and that the air holes, consequently, are relatively large, adding limitations to the waveguide forming ability of the mentioned holes. Optical polymers are, furthermore, often showing losses that are significantly higher in the near infrared wavelength range (around 1300–1600 nm) of particular interest to the optical communications industry. Therefore, it would be relevant to use alternative material combinations and means of additional waveguide modification as described by the present invention. It is a further disadvantage of the disclosures by Eggleton that no means for selectively filling the holes are disclosed.

Fedotov et al. "Tuning the Photonic Band Gap of Sub-500-nm-Pitch Holey Fibers in the 930–1030-nm Range", Laser Physics. 2000. V. 10. N. 5. P. 1086 discloses microstructured optical fibres with filled holes that provide tuning of photonic bandgap properties. Zheltikov et al., Journal of Experimental and Theoretical Physics Vol 93(3) pp. 499–509. September 2001 disclose similar fibres as Federov et al.

It is a disadvantage of the disclosures by Fedotov et al. and Zheltikov et al. that no means for selectively filling the holes are disclosed.

It is an object of the present invention to provide a new class of optical waveguides, in which the optical waveguiding properties may be actively modified in order to obtain tuneability of the optical fibre devices.

It is a further object of the present invention to provide means of introducing active materials, which are soluble in liquids, in the fibre waveguides for applications in components such as light emitters, lasers and amplifiers, e.g. tuneable DFB or DBF fibre lasers.

It is a still further object of the present invention to provide component designs for improved control of the optical fibre components.

It is a still further object of the present invention to provide optical sensor designs, which may allow single-mode as well as multi-mode fibre sensors to be realised.

It is a still further object of the present invention to provide fibre waveguide devices, which are easy to manufacture.

SUMMARY OF THE INVENTION

In the present application the terms photonic crystal fibres (PCF) and microstructured fibres are used interchangeably for optical waveguides for guiding light comprising so-called microstructures in the cladding and/or core regions. In general the fibres have a longitudinal direction defined by the direction of light guidance.

In the present context the terms 'fundamental mode' and 'higher order modes' refer to field solutions of Maxwell's equations for propagation of electromagnetic waves in a guiding system, in particular such solutions that fulfil the boundary conditions imposed by the waveguide in question, a 'fundamental mode' being characterized in that it shows no variation in one of the directions of the chosen coordinate system in a cross section of the waveguide (i.e. azimuthally or radially in a circular waveguide). The fundamental (or dominant) mode is the mode having the lowest cut-off frequency for the waveguide configuration in question. In a circular optical waveguide the fundamental mode is termed $LP_{01}$ representing a linearly polarized mode with no field variation in the azimuthal direction of a circular waveguide. Higher order modes are termed $LP_{nl}$, n=l=1 or n or l being greater than or equal to 2 and being distinguished in the electromagnetic field having n zero points in the azimuthal and m in a radial direction.

In this application we distinguish between "refractive index", "geometrical index" and "effective index". The refractive index is the conventional refractive index of a homogeneous material. The geometrical index of a structure is the geometrically weighted refractive index of the structure. In the present context, the geometrical (or average) index for a region with spatially varying refractive index (be it continuous or discontinuous (such as in the case of enclosed microstructures)), the geometrical index is taken to mean the refractive index averaged over the volume or area in question (e.g. $(1/A)\int n(r,\phi)drd\phi$, over $r=r_{min}\to r_{max}$ and $\phi=0\to 2\pi$ for a given region (e.g. central, core or cladding) represented in plane polar coordinates in a fibre cross section). As an example, a structure consisting of 40% air (refractive index=1.0) and 60% silica (refractive index≈1.45) has a geometrical index of 0.4×1.0+0.6×1.45=1.27. The procedure of determining the effective refractive index, which for short is referred to as the effective index, of a given micro-structure at a given wavelength is well-known to those skilled in the art (see e.g., Joannopoulos et al., "Photonic Crystals", Princeton University Press, 1995 or Broeng et al., Optical Fiber Technology, Vol. 5, pp. 305–330, 1999).

For micro-structures, a directly measurable quantity is the so-called filling fraction that is the volume of disposed features in a micro-structure relative to the total volume of a micro-structure. For fibres that are invariant in the axial fibre direction, the filling fraction may be determined from direct inspection of the fibre cross-section.

The present invention relates to an optical fibre for transmission of light at a predetermined wavelength $\lambda_0$, the optical fibre having a longitudinal direction (z), a cross-section (r,$\phi$) perpendicular to the longitudinal direction, a length L and an outer periphery $r_{fibre}(\phi)$ in a cross section, the optical fibre comprising:

a core region, said core region having a centre axis in the longitudinal direction, said core region extending along and including said centre axis, said core region having an outer periphery $r_{core}(\phi)$ and a refractive index $n_{core}(r,\phi)$, and a geometrical index $n_{g,core}$ in a cross-section of the fibre, an inner cladding region, said inner cladding region extending along the longitudinal direction, said inner cladding region surrounding and neighbouring said core region, said inner cladding region having an inner periphery $r_{iclad,inner}(\phi)$, that coincides with $r_{core}(\phi)$ and an outer periphery $r_{iclad,outer}(\phi)$ and a refractive index $n_{iclad}(r,\phi)$ and a geometrical index $n_{g,iclad}$ in said cross-section of the fibre, said inner cladding region comprising N spaced apart voids, said voids being located in a background material and extending in the longitudinal direction, each void having a centre and an outer periphery $r_{void,i}(\phi)$, i=1–N, in a cross-section of the fibre, and wherein N is larger than one, and an outer cladding region, said outer cladding region extending along the longitudinal direction and enclosing said inner cladding region, said outer cladding region having an inner periphery $r_{oclad,inner}(\phi)$ that coincides with said outer periphery $r_{iclad,outer}(\phi)$ of said inner cladding region and a refractive index $n_{oclad}(r,\phi)$ and a geometrical refractive index $n_{g,oclad}$ in a cross-section of the fibre, wherein $n_{g,oclad} < n_{g,core}$ and wherein a predetermined TBF-selection of Q of said voids over a certain part $L_{fill,j}$ extending between $z_{fill,j-2}$ and $z_{fill,j-1}$ of the length L of said fibre contains a substance, said substance-containing voids having a refractive index $n_{void,fill,j}(r,\phi)$, j=1–Q in a cross-section of the fibre.

In the present context, the term 'region' is taken to mean a body constituting a part of the fibre that differs from other parts of the fibre in its material composition and/or refractive index and/or content of microstructural features.

The term 'TBF-selection of voids' is in the present context taken to mean those voids selected to be filled with a fluid substance, in the meaning that some fluid substance is to be introduced or infused into the void in question (not necessarily that it is actually filled with a liquid substance over its entire length)).

The term 'a certain part $L_{fill,j}$ of the length L' is taken to mean a part of the length L of the fibre (i.e. $L_{fill,j} < L$) but optionally including the full length L of the fibre (i.e. $L_{fill,j} = L$).

The functions $r_{fibre}(\phi)$, $r_{core}(\phi)$, $r_{iclad,inner}(\phi)$, $r_{iclad,outer}(\phi)$, $r_{oclad,inner}(\phi)$, $r_{oclad,outer}(\phi)$, and $r_{void,i}(\phi)$ represent the position vector of the corresponding peripheries described in a plane polar coordinate system with its centre in the centre of the fibre (represented by the centre of the core region) for a given fibre cross section.

In a preferred embodiment, the fibre has the same cross-section throughout its entire length. This need, however, not be the case. A variation of the cross-sectional dimensions of features of the cladding and core regions in the longitudinal direction (be it periodic or non-periodic, continuous or discontinuous) is in principle possible.

In a preferred embodiment the peripheries of the core and inner cladding regions are substantially elliptical. This may be used to enhance the waveguiding properties of specifically oriented higher order modes.

In another preferred embodiment the peripheries of the core and cladding regions are substantially circular (i.e. $r_x(\phi)=r_x$, independent of $\phi$).

The terms 'substantially elliptical' or 'substantially circular' are taken to mean that the deviation of the path in question from a true elliptical or circular, respectively, in a cross section of the fibre is less than 10% including process variations.

The term, 'uniform within process variations' is in the present context taken to mean uniform to within the limits that the used fabrication technology is capable of implementing for example silica doped refractive index profiles. Considering for example a down-doped silica region, such as using F-doping of silica, present doping methods, such as for example using chemical vapour deposition techniques, may yield a minor variation of the refractive index in radial direction. In the case of for example a void in the fibre centre, the process variation will naturally be significantly lower and in practice negligible.

In preferred embodiments, the maximum radial dimension of the core is smaller than 0.5 μm ($r_{core,max} \leq 0.5$ μm), such as smaller than 1 μm, such as smaller than 2 μm, such as smaller than 5 μm, such as smaller than 8 μm.

In yet other preferred embodiments, the maximum outer radial dimension of the inner cladding region comprising the voids is chosen to be between 2.0 μm and 5.0 μm, such as smaller than 10 μm, such as smaller than 20 μm, such as smaller than 30 μm, such as smaller than 60 μm.

In a preferred embodiment the core consists of a homogeneous 'background' material (i.e. without microstructural features) with refractive index $n_{core,back}$. In a further preferred embodiment, the refractive index $n_{core,back}$ is independent of the azimuthal direction, $n_{core,back}=n_{core,back}(r)$ in a given cross section. In a further preferred embodiment, the refractive index $n_{core,back}$ is uniform ($n_{core,back,0}$) within process variations in a given cross section.

In a preferred embodiment of the present invention, $n_{g,iclad}<n_{g,core}$. In a preferred embodiment $n_{g,iclad}<n_{g,oclad}$.

In a preferred embodiment, the relative difference in geometrical refractive index between the core region and the inner cladding region is larger than 0.5%. In another preferred embodiment, the relative difference in geometrical refractive index between the core region and the inner cladding region is larger than 1%. In yet another preferred embodiment, the relative difference in geometrical refractive index between the core region and the inner cladding region is larger than 2%.

In a preferred embodiment the outer cladding region consists of a homogeneous 'background' material (i.e. without microstructural features) with refractive index $n_{oclad,back}$. In a further preferred embodiment, the refractive index $n_{oclad,back}$ is independent of the azimuthal direction, $n_{oclad,back}=n_{oclad,back}(r)$ in a given cross section. In a further preferred embodiment, the outer cladding background material has a refractive index $n_{oclad,back,0}$, which is uniform within process variations in a given cross section.

In a preferred embodiment the core is a silica core doped with Ge and the background material of the inner and the outer cladding regions is undoped silica.

The inclusion of microstructures (voids, filled and partially filled voids) in the fibre cladding is advantageously used to enhance the waveguiding properties of the fibres by providing stronger refractive index contrasts. The use of microstructures further yields a higher flexibility in the choice of materials.

In a preferred embodiment, the voids are of identical, essentially circular shape ($r_{void,i}(\phi) \approx r_{void}$, i=1–N). The voids may, however, have other forms than circular, such as elliptical. Further, e.g. substantially polygonal (e.g. triangular, rectangular, specifically quadratic or hexagonal), possibly with curved edges, e.g. towards the centre are possible. Likewise, the voids need not be of similar size, and may be positioned in a non-periodic pattern.

In a preferred embodiment, the voids are placed in a predominantly periodic pattern (within a given region) when viewed in a cross section of the fibre. The term 'a predominantly periodic pattern' is in the present context taken to indicate that minor fluctuations of hole sizes and/or centre positions may be introduced during fabrication.

In preferred embodiments, the maximum radial dimensions of the voids $r_{void,i,max}$ are less than 14 μm, such as less than 12 μm, such as less than 10 μm, such as less than 8 μm, such as less than 6 μm, such as less than 4 μm, such as less than 2 μm, such as less than 1 μm, i=1, 2, . . . , N.

In preferred embodiments, the maximum radial dimensions of the voids $r_{void,i,max}$ relative to the maximum radial dimension of the fibre $r_{fibre,max}$ are less than 25%, such as less than 20%, such as less than 15%, such as less than 10%, such as less than 5%, such as less than 2%. The maximum radial dimension of the fibre is taken to include the overcladding of the fibre.

In a preferred embodiment, the refractive indices of the filled part of the voids $n_{void,fill,j}(r,\phi)$, j=1–Q are uniform within process variations in a given cross section of the fibre ($n_{void,fill,j}(r,\phi) \approx n_{void,fill,j}$, j=1, 2, . . . , Q).

In a preferred embodiment the inner cladding region consists of a homogeneous 'background' material with refractive index $n_{iclad,back}$, wherein microstructural features in the form of voids, filled and partially filled voids are located.

In a preferred embodiment, the refractive indices of the filled part of the voids, $n_{void,fill,j}$, j=1–Q, are smaller than the refractive index of the 'background' material $n_{iclad,back}$.

In a preferred embodiment, the refractive indices of the filled part of the voids, $n_{void,fill,j}$, j=1–Q, are larger than the refractive index of the 'background' material $n_{iclad,back}$.

In a preferred embodiment, the refractive indices of the filled part of a predetermined TBF-selection of M of the voids $n_{void,fill,m}$, m=1–M, are smaller than the refractive index of the 'background' material $n_{iclad,back}$, and the refractive indices of the filled part of another predetermined TBF-selection of P of the voids $n_{void,fill,p}$, p=1–P, are larger than the refractive index of the 'background' material $n_{iclad,back}$.

This has the advantage of enhancing the design flexibility by introducing low index material in certain regions of the fibre and high index material in other regions (compared to the 'background' material).

The substance that is introduced into the voids may comprise materials with optical amplification or attenuation at the wavelength $\lambda_0$, in other words materials for which the refractive indices $n_{void,fill,j}$ have an imaginary part in a complex representation of n. Fibres with attenuation (or amplification) in a range from less than 1 dB/km to several thousand dB/mm may be implemented by varying the choice of materials, concentration of active ions, location of the material in the fibre cross section, density of the filled voids in a fibre cross section, etc.

It is generally assumed that the basis material for the optical fibres according to the present invention is silica or silica doped with at least one member of the group consisting of Ge, Al, P, Sn, B, Er, Yb, Nd, La, Ho, Dy and/or Tm. However, the principles and ideas behind the invention are not limited to the use of these materials but may include other compound glasses (e.g., chalcogenide), polymers and low-melting point glasses.

An advantage of the invention is that a fibre with a predetermined variation of geometrical (and effective) refractive index (and thus the distribution of the guided modes in the waveguide cross section) in the longitudinal as well as the transversal direction of the fibre may be provided by properly distributing the voids in the fibre cross section and by properly selecting the voids to be filled and by properly selecting the materials to fill into the voids and by modifying the position of the liquid 'string' in each void (possibly individually, possibly using different fluids for different voids or possibly different fluids in the same void, with a possible curing phase between the infusions).

In a preferred embodiment, said substance is a fluid substance. In a preferred embodiment, said substance is a fluid substance at an operating temperature used during filling of the substance into the voids. Thus a filling material that is solid at normal operating temperatures of the fibre, e.g. room temperature, but a 'fluid substance' at an appropriate elevated temperature used during filling may advantageously be used.

In the present context, the term 'fluid substance' is taken to mean a substance that, when introduced into the voids of the fibre, act as a liquid or a gas, in other words is capable of flowing relatively easily (possibly using overpressure), for example a fluid substance with a non-linear optical response. The fluid may be added to the void after the production of the fibre. This has the obvious advantage of giving an enhanced design freedom as regards tailoring significant properties (including refractive index, attenuation, amplification) of a particular part of the fibre.

It is a further advantage that the spatial dependence of the indices may be altered by repositioning the liquid strings in the voids (again possibly individually).

In a preferred embodiment, said TBF-selection comprises a number of voids Q, Q being less than the total number of voids N.

In a preferred embodiment, said fluid substance, at least for one void, is filling said void over only a part of the length L of said fibre.

In other words, $z_{fill,j-2} - z_{fill,j-1} < L$, for the voids that are only partially filled.

An advantage thereof is that the refractive index may be customized by designing a 'filling' profile for each cross section of the fibre, thereby gradually changing the refractive index (and thus the guiding properties) of the fibre over its length.

In a preferred embodiment, the core region comprises one or more voids.

In preferred embodiments, the maximum radial dimensions of the voids of the core $r_{cvoid,i,max}$ are less than 6 µm, such as less than 4 µm, such as less than 2 µm, such as less than 1 µm, i=1, 2, . . . , L, L being the number of voids in the core.

In a preferred embodiment, the core region comprises a central void.

In a preferred embodiment, the core region comprises a central void surrounded by an annular segment.

In a preferred embodiment, the one or more voids are filled with a fluid substance.

In a preferred embodiment, at least the central void of the core region is filled with a material from the group comprising, a gas, a liquid, a polymer, un-doped silica glass. Again, this further improves the possibilities of tailoring the refractive index and propagation loss of the central region of the core.

In a preferred embodiment, voids in the core and or the inner cladding region are arranged in a pattern, which ensures an at-most-two-fold rotational symmetry about the centre axis.

In a preferred embodiment, voids in the core and or the inner cladding region are arranged in a pattern, which ensures an at-most-four-fold rotational symmetry about the centre axis.

Such fibres may be especially relevant for enhanced propagation of higher-order modes because the restricted rotational symmetry of the refractive indices and the mutual relative size of the various regions of the fibres fit the modal shape of the electromagnetic field of this mode.

In a preferred embodiment, K fluid substances are introduced into predetermined TBF-selections of said voids, so that fluid k is introduced in TBF-selection k and K is greater than one.

An advantage thereof is that it adds to the flexibility and freedom to tailor the optical properties of fibres to specific applications. The fluid substances may be cured after the filling process. In a preferred embodiment the same void is filled with different liquid substances, where the first substance to be filled into the void is cured before the subsequent substance is added to avoid mixture of the substances. In a preferred embodiment one or both ends of said fibre are hermetically closed, and possibly evacuated first to avoid chemical interaction with the atmosphere present in the unfilled part of the 'filled' voids and in the 'un-filled' voids.

In a preferred embodiment, said fluid substance comprises optically active ions chosen from the group comprising Ge, F, P, Sn, Bm, Er, Yb, Nd, La, Ho, Dy, Tm.

In a preferred embodiment, the fluid substance comprises Er. Other candidates may be other rare-earth and transition metal ions. In a preferred embodiment the fluid substance comprises a magnetic material possibly in the form of magnetic particles.

In preferred embodiments, the fluid substance comprises materials whose optical properties are tuneable, e.g. thermo-optically, electro-optically, magneto-optically.

In a preferred embodiment, said fluid substance comprises a dye.

In a preferred embodiment, the position of said fluid substance in a longitudinal direction of the fibre may be controlled by means of an applied pressure at one end of the fibre.

This is achieved by adapting the viscosity of the fluid substance to the size of the voids and the length of the fibre with a view to the temperature during positioning. The positioning of the fluid may be performed at elevated temperatures, compared to a normal operating temperature.

The invention further relates to a method of introducing a fluid substance into one or more voids of a length of TBF-micro-structured fibre, said fibre having a first and a second end and comprising N such voids, the voids extending in a longitudinal direction of the fibre over its full length, the method comprising the steps of
1. preparing and fixing said first and second ends of the fibre
2. identifying a TBF-selection of Q voids to be filled with said fluid substance
3. identifying a NTBF-selection of N–Q voids that are not to be filled with said fluid substance
4. providing the openings of said NTBF-selection of voids with a closely fitting masking element in said second end of the fibre
5. infusing said fluid substance into said TBF-selection of voids from said second end of the fibre.

The term 'NTBF-selection of voids' is in the present context taken to mean those voids selected NOT to be filled with the fluid substance in question, i.e. the complementary between the full set of voids and the TBF-selection of voids to be filled with the fluid substance in question. In other words the NTBF-selection of voids may include voids that have been or are to be filled with another fluid substance.

During the filling process, it is preferred that the air that is to be driven out of the voids to be filled with liquid can easily escape, in other words, that the openings of the voids at the ends are unblocked. This may be facilitated by preparing clean end-surfaces, e.g. by cutting or polishing and optionally streaming a gas, e.g. air, through the voids prior to the filling process.

The term 'masking element' is in the present context taken to mean an object or a group of objects that cover the openings of the voids that are not to be filled with the actual fluid substance in such a way that no liquid is infused into those voids during the infusion process. The masking element may comprise individual objects, e.g. plates, each covering one or a group of voids. The masking element may comprise an appropriate liquid with a large enough viscosity (or e.g. a melted metal or a curable liquid), a glue or an adhesive, a polymer or other material, which may be cured, e.g. by means of heat or light (e.g. UV-light).

In a preferred embodiment, the masking element in step 4 comprises a length of microstructured masking fibre, said masking fibre having a first and second end and comprising one or more voids extending in its longitudinal direction over its full length, said first end of said masking fibre being abutted with said second end of said TBF-microstructured fibre and so aligned therewith that the openings of said one or more voids of said first end of said masking fibre enclose at least one and preferably all of the openings of said TBF-selection of Q voids to be filled with said fluid substance and none of the openings of said NTBF-selection of N–Q voids that are not to be filled with said fluid substance.

In a preferred embodiment, infusion of fluid in step 5 is performed through said second end of said masking fibre.

In a preferred embodiment, the masking fibre comprises one centrally located void whose opening in its first end, when abutted and coaxially positioned with said second end of said TFB-microstructured fibre, enclose all of said TBF-selection of Q voids and none of the openings of said NTBF-selection of N–Q voids.

In a preferred embodiment, the infusion of liquid in step 5 is performed by immersing said second end of said TBF-microstructured fibre in said fluid substance and connecting said first end of said TBF-microstructured fibre to a pump and activating the pump so that said liquid substance is sucked into one or preferably all of said TBF-selection of Q voids.

In a preferred embodiment all of said voids are being evacuated, whereby the masking element, e.g. a masking fibre or masking plates, is held in place at the second end of the fibre.

In a preferred embodiment, the fluid substance is being heated before the infusion into the fibre to lower its viscosity thereby easing its flow in the voids. In a preferred embodiment step 5 is carried out by placing the substance to be infused in an oven, possibly including also the TBF-microstructured fibre in full or in part, possibly leaving only the pump outside. This arrangement allows the introduction of substances that are solid at room temperature, e.g. various metals or alloys, into the voids of the fibre.

The method allows any fluid substance having a suitable viscosity (with a view to the dimension of the void) at room temperature or at an elevated temperature (well below the melting point of the fibre) to be introduced into the voids of the microstructured fibre. Such materials include dyes or other materials providing optical gain, materials with specific spectral attenuation profiles, metals, polymers, etc.

The method may be repeated to introduce another fluid substance into another TBF-selection of voids using another masking element. The method may also comprise an extra step after step 5 comprising a curing of the infused substance, e.g. UV-curing. The method may also be used to introduce different fluid substances into the same TBF-selection of voids.

The invention further relates to a method of controlling the location of a fluid substance in a void of a length of micro-structured fibre, said fibre having a first and second end, the fluid substance extending over only a fraction of said length leaving a first part adjacent to said first end and a second part adjacent to said second end of the fibre free of fluid, the method comprising heating the first part of the fibre, if the liquid is to be moved towards the second end and heating the second part of the fibre, if the liquid is to be moved towards the first end.

In a preferred embodiment, the micro-structured fibre used in 'the method of controlling the location of a fluid substance in a void of a length of micro-structured fibre' is an 'optical fibre' as described above and as defined in the accompanying claims.

The heating creates an increased pressure at the nearest surface of the fluid substance and thus a force in a direction away from the heating source. In a preferred embodiment, the heating of one end is combined with the cooling of the other end, which enhances the effect. The combined heating and cooling function may be implemented by a combination of a resistor and a Peltier element mounted around each end of the fibre.

In a preferred embodiment, the openings of the voids, at least those of the filled voids, at the ends of the fibre are uncovered to allow the changing pressures during movement of the liquid strings at each end to be equalized.

The invention further relates to a fibre laser or amplifier comprising a length L of active microstructured fibre, said active microstructured fibre having a first and a second end and first and second reflective elements, said active microstructured fibre comprising N voids, the voids extending in a longitudinal direction of the fibre over its full length, wherein a predetermined TBF-selection of Q of said voids over a certain part $L_{fill,j}$ of the length L of said fibre contains a substance, said substance comprising optically active materials, said first and second reflective elements and said voids comprising optically active materials defining a laser cavity, each end of said active microstructured fibre being connected to an optical waveguide for, respectively, entering light into and transmitting light from said laser cavity.

The optical waveguide may be a standard optical fibre, a microstructured fibre or any other waveguide suitable for providing light to and from said active microstructured fibre. The fibres at each end may be different (one e.g. optimized for transmitting pump light, the other for transmitting the output from the laser).

In a preferred embodiment, the micro-structured fibre used in 'the fibre laser or amplifier' is an 'optical fibre' as described above and as defined in the accompanying claims.

The lengths $L_{fill,j}$ of the parts of the j=1, 2, ... Q voids that contain the substance need not be identical, nor need they be centrally positioned in the longitudinal direction of the fibre.

In a preferred embodiment a standard optical fibre is spliced to each end of a microstructured fibre. In a preferred embodiment, the fluid substance comprises Er. In a preferred embodiment, the fluid substance is located symmetrically around the middle in the longitudinal direction of the fibre. In a preferred embodiment, the voids containing the fluid substance are distributed densely in the azimuthal direction in several radial layers in a cross section of the microstructured fibre. In a preferred embodiment, voids containing the fluid substance are substantially identical in cross section and their centre-centre distance $\Lambda$ is smaller than 3 times the maximum radial dimension $r_{void,i,max}$ of the voids.

The invention further relates to a fibre laser or amplifier of the above mentioned type, comprising a length L of active microstructured fibre implemented according to the above embodiments of the invention.

In a preferred embodiment, said substance is a liquid, and the fibre laser or amplifier further comprises at each end of said active microstructured fibre an element for modifying the pressure inside the fluid substance-containing voids of the active microstructured fibre.

In a preferred embodiment, the element for modifying the pressure is a resistive element wound around the active microstructured fibre, possibly combined with a cooling element, e.g. a Peltier element.

The invention further relates to a fibre laser or amplifier of the above mentioned type, wherein said substance is introduced according to the method described above.

In a preferred embodiment, said substance in the voids comprises a material (gas, liquid or solid, crystalline or non-crystalline) for externally controlling the laser wavelength. The mode selected by the laser cavity is dependent on the refractive index-environment of the core and its nearest surroundings. By changing the optical properties of the substance introduced into the voids by means of external parameters (electron, magneto-, thermo-optic), the mode selected by the laser cavity may be controlled and thereby the wavelength, thus providing a tuneable laser.

In a preferred embodiment, the material in the voids is positioned between the reflecting elements.

In a preferred embodiment, the material in the voids extends between and includes the reflecting elements.

In a preferred embodiment, the reflecting elements are UV-written gratings. Alternatively the reflecting elements may take the form of reflecting mirrors, e.g. arranged on each end of the active microstructured fibre by a deposition technique.

Using the merits of the invention tuneable DFB and DBR fibre lasers may be implemented.

The invention further relates to an optical pressure sensor comprising a light source feeding light into a first end of an optical waveguide, a length L of a sensing micro-structured fibre having a first and a second end, said first end of said sensing micro-structured fibre being connected to a second end of said optical waveguide, said sensing microstructured fibre comprising N voids, the voids extending in a longitudinal direction of the fibre over its full length, wherein a predetermined TBF-selection of Q of said voids over a certain part $L_{fill,j}$ of the length L of said fibre contains a fluid substance, said individual lengths of fluid substance in said Q voids being of substantially identical length $L_{fill}$ and being aligned in the longitudinal direction, said fluid containing voids having a refractive index $n_{void,fill,j}(r,\phi)$, j=1–Q in a cross-section of the fibre, said predetermined TBF-selection of voids and said refrative index $n_{void,fill,j}$ being adapted to provide a detectable leakage of light in a radial direction from said fibre over the length $L_{fill}$, said leakage of light being detected by an optical detector.

The term the lengths of the fluid strings being of 'substantially the same length' is in the present context taken to mean having the same length within 10%, preferaby within 5%.

The term 'being adapted to provide a detectable leakage of light' is in the present context taken to mean that the light may be detected by a standard optical detector such as a photo diode. The amount of light leaked may be increased by increasing the density and number of voids filled with a liquid substance, and by increasing the refractive index of the liquid substance.

The optical waveguide may be a standard optical fibre, a microstructured fibre or any other waveguide suitable for providing light to and from said sensing microstructured fibre. The optical waveguide may be single-mode as well as multi-mode.

The liquid-filled (high index) section of the sensing microstructured fibre will result in a relatively large modification (leakage) of the guided mode. The location of the leaking of light (as detected by a photo detector) may indicate the pressure at the measurement point as given by second end of the sensing microstructured fibre.

In a preferred embodiment said optical detector is implemented as a string of optical detectors positioned along the active length of the microstructured fibre.

In a preferred embodiment said light source is substituted by said optical detector and vice versa. Instead of feeding light into one end of the optical waveguide, light is fed into the cladding of the microstructured waveguide and detected by an optical detector positioned at the end of the optical waveguide.

The invention further relates to a non-linear optical component for modifying a propagating mode comprising at least one length of microstructured optical fibre, said at least one length of microstructured fibre comprising one or more voids extending in a longitudinal direction of said fibre, wherein one or more of said voids contain a fluid substance, where the cross sectional area of said one or more fluid filled voids changes over its length.

In a preferred embodiment, the micro-structured fibre used in 'the non-linear optical component for modifying a propagating mode comprising at least one length of microstructured optical fibre' is an 'optical fibre' as described above and as defined in the accompanying claims.

In a preferred embodiment, said one or more voids comprising a fluid substance have a tapered cross section.

The tapering (inward) may be implemented by heating the fibre in a flame and simultaneously stretching it. Alternatively, an outward tapering may be implemented by heating the fibre in a flame and providing the void in question with an appropriate pressure, the tube constituting the void in question possibly being prepared in advance with a softening agent (possibly in the preform). The amount of heating must be adjusted so that care is taken not to collapse the voids of the fibre.

In a preferred embodiment, the optical component comprises 2 abutted sections of microstructured optical fibre, having the same outer diameter and each comprising voids having identical centres in the abutted cross sections, wherein the one or more voids comprising a fluid substance have different cross sectional areas.

The abutted sections may be prepared in advance to fit tightly to each other, and be joined together by gluing or splicing along the external periphery of the joint.

In a preferred embodiment, a standard optical fibre is spliced to one end of a length of microstructured fibre.

A non-linear, tuneable optical device is provided by moving the liquid over the variable cross sectional area of the voids, e.g. using air pressure or by changing the temperature of the liquid thereby changing its volume.

The invention further relates to an optical component comprising at least one length of microstructured optical fibre, said at least one length of microstructured fibre comprising one or more voids extending in a longitudinal direction of said fibre, wherein access to said voids is improved by providing the fibre with at least one oblique surface.

In a preferred embodiment, the micro-structured fibre used in 'the optical component' is an 'optical fibre' as described above and as defined in the accompanying claims.

The term an 'oblique surface' is in the present context taken to mean a surface that is non-perpendicular to the longitudinal direction of the fibre so that the area of the opening of a particular void in said oblique surface is increased compared to a cross section perpendicular to the longitudinal direction of the fibre.

In a preferred embodiment said oblique surface is a curved surface established in the outer longitudinal surface of the fibre (i.e. not including an end of the fibre).

In a preferred embodiment, said oblique surface is a plane surface established at one or both ends of the microstructured fibre.

In a preferred embodiment, said surface or surfaces is/are made by polishing.

In a preferred embodiment, said voids comprise a substance, e.g. a metallic substance or an electro-optic substance.

An advantage of the invention is that the access to the voids becomes better. This may be used in connection with the filling process and in connection with the control of properties of materials in the voids, e.g. to apply an electric potential to a particular void.

In a preferred embodiment, a standard optical fibre is spliced to each end of a length of microstructured fibre for providing light to and from the component, and a curved surface is established at each end of a length of microstructured fibre, thus providing access to the substances contained in the voids even in a situation where the ends of the length of microstructured fibre are covered by the connecting standard optical fibres.

Its should be noted that the embodiments of the present invention may be combined; so that e.g. the microstructured fibre, laser or amplifier, the pressure sensor, etc. may be filled with a substance in some of the voids using the method of introducing a fluid substance and an improved access to the voids may be implemented as described for the optical component by providing one or more oblique surfaces and the non-linear properties be enhanced by implementing a variable cross section of one or more of the voids filled with a fluid substance.

It is to be understood that both the foregoing general description as well as the following detailed description are merely exemplary of the invention, and are intended to provide an overview or framework for understanding the nature and character of the invention as it is claimed.

DETAILED DESCRIPTION OF THE INVENTION

Figure 1:
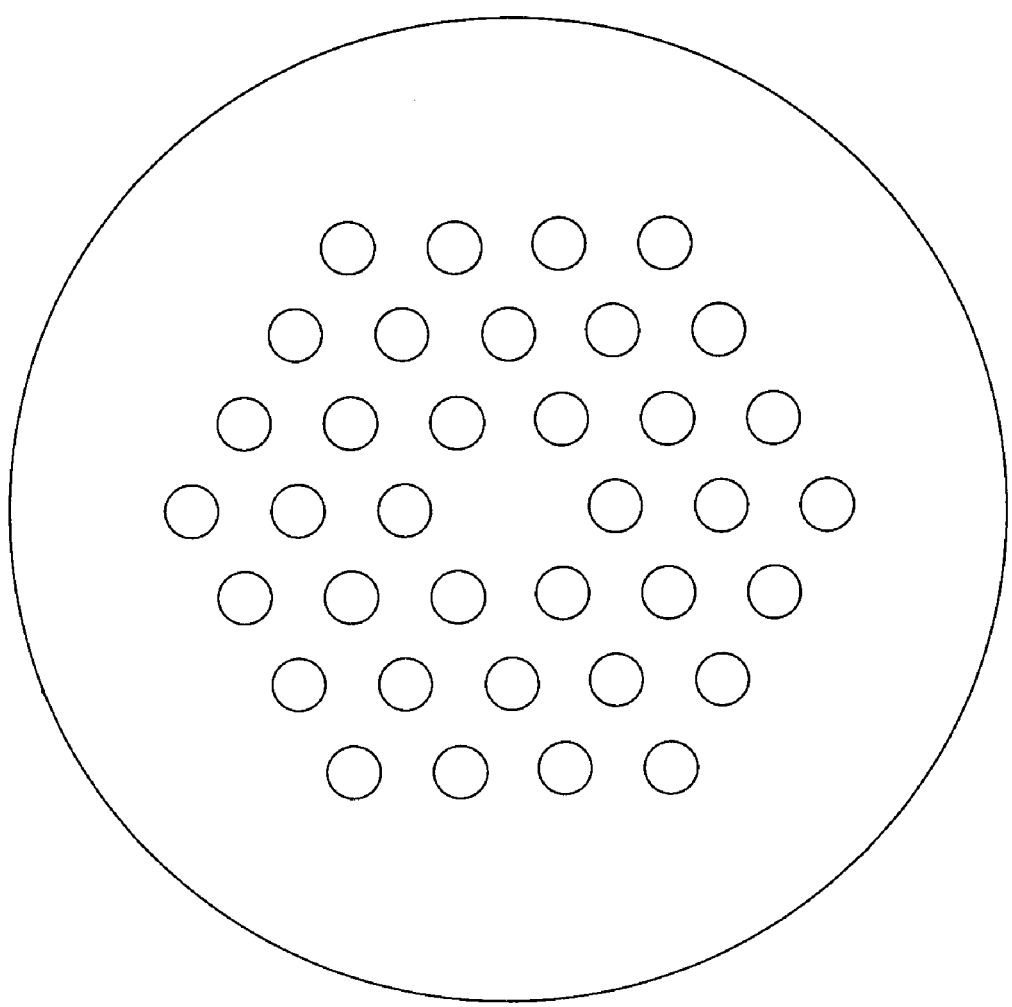
FIG. 1 shows a schematic cross sectional view of a prior-art high-index core (or M-TIR) photonic crystal fibre with an air-hole distribution in a triangular structure.

If we take point of reference in the recent development of optical fibres, a very important development have been the appearance of photonic crystal fibres (PCFs), which typically are manufactured from pure silica with a number of microscopic holes placed in the full length parallel to the axis of the fibre. A schematic illustration of the cross section of a PCF of an often discussed type is shown in FIG. 1. The specific fibre has a solid silica core surrounded by a cladding consisting of air-filled holes placed in a regular triangular pattern according to prior art. This fibre guides light by the principle of modified total internal reflection (M-TIR), which is to some degree similar to the waveguiding principle of standard optical fibres, but has different spectral properties.

Figure 2:
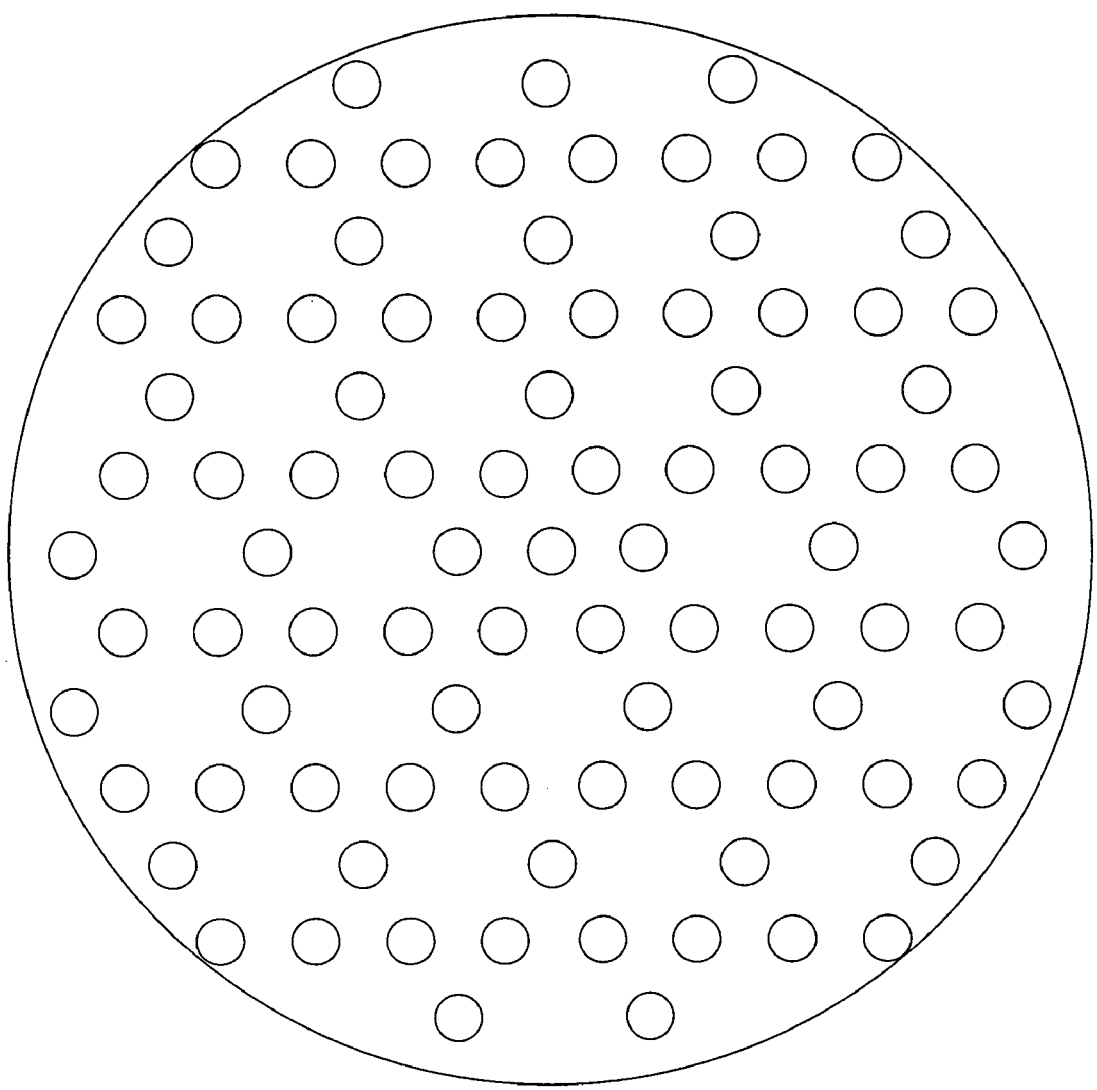
FIG. 2 shows a cross sectional view of a prior-art low-index core (or PBG) photonic crystal fibre with a cladding air-hole distribution placed according to the honey-comb pattern.

Another type of PCF according to prior art is illustrated on FIG. 2, which shows a so-called photonic bandgap (PBG) fibre. This type of waveguide operates by a fundamentally different waveguiding principle, since the guided mode field is located in and around the central air-hole and the cladding (which in the specific case is arranged in a honeycomb pattern) works as a Bragg grating through its periodicity on a scale comparable to the optical wavelength.

Figure 3:
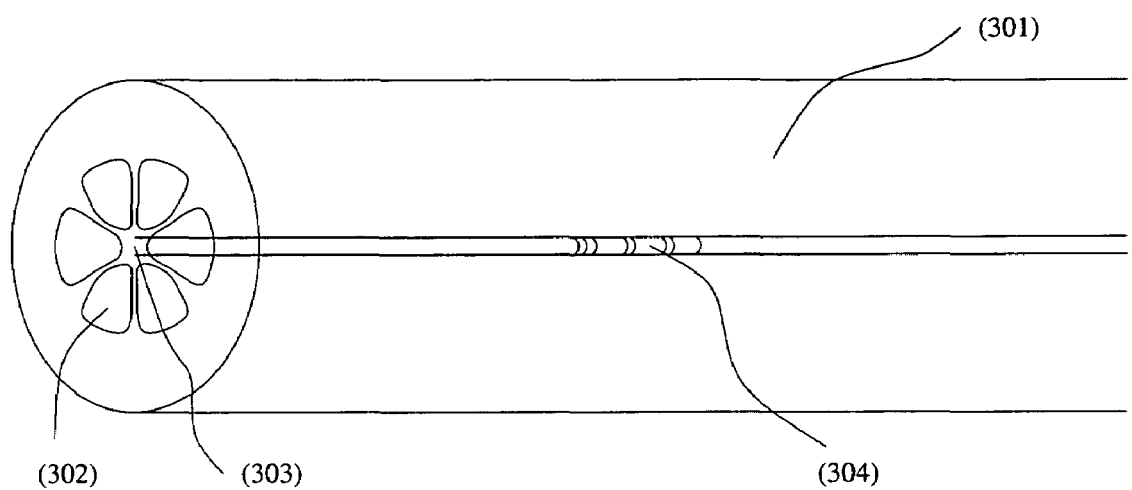
FIG. 3 illustrates schematically a microstructured optical fibre in which the cladding holes according to prior art are filled with a polymer.

Both classes of photonic crystal fibres do not only show fundamentally new possibilities within the area of fibre optics, but they are also characterised by the fact that they have air-holes responsible for the waveguiding principle. The idea that these holes may be filled with a material different from air has already been described e.g. in the work by Eggleton et al. (Optics Express, Vol. 9, No. 13, December 2001, pp. 698–713), and it is even suggested that relatively large holes are filled with a polymer material having a refractive index which is dependent on the temperature of the material. An outline of such a structure is illustrated in FIG. 3, where the silica fibre 301 contains voids 302 filled with a temperature sensitive polymer. The fibre core 303 guides the light along the fibre and confines the light to the core. The cladding modes, however, extend into the region of polymer filled voids 302, and consequently it is possible to change the effective refractive index of the cladding modes by modifying the refractive index of the polymer, but without suffering from high losses for the core mode. The coupling from core to cladding modes take place due to the fibre Bragg grating 304.

Figure 4:
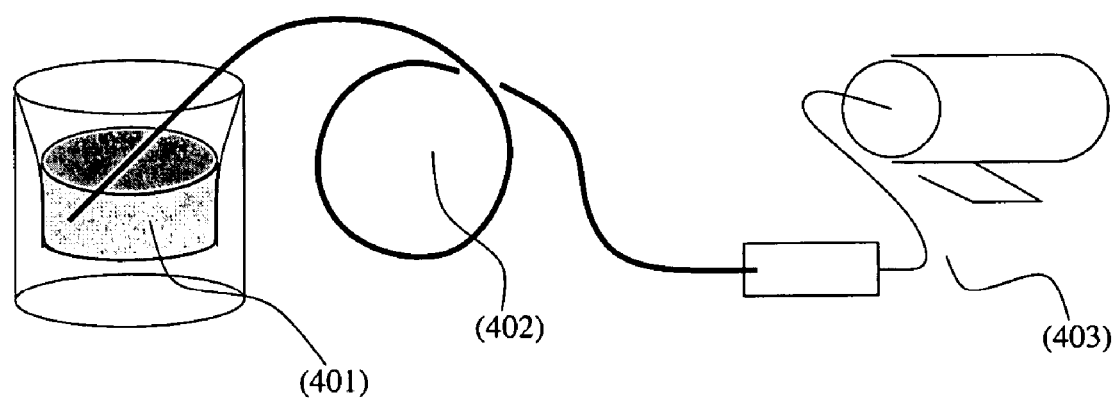
FIG. 4 schematically shows a set-up for filling of holes in photonic crystal fibres with liquids.

Various methods of filling the voids in the microstructured fibres may be employed. One method is illustrated in FIG. 4, which shows a material for filling the voids 401 on liquid form. This may include materials which are brought to an elevated temperature at which they are on a liquid form, or it may be materials placed in a solution (e.g., dyes or other gain materials, or materials with specific spectral attenuation profiles), or even materials that are curable (e.g., like UV curable polymers), and which consequently may be brought on a solid form once they have been introduced in the photonic crystal fibre 402, for example through the use of a pump 403.

Figure 5:
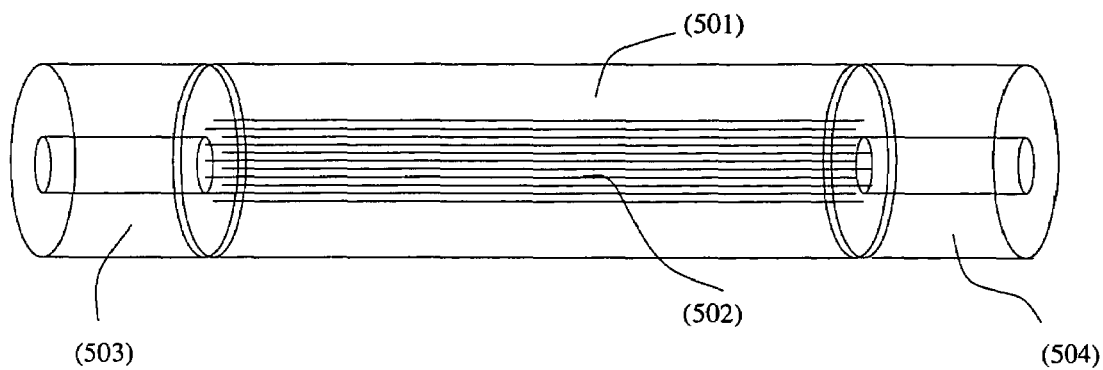
FIG. 5 illustrates how a photonic crystal fibre is spliced to standard optical fibres providing a possible mode mismatch and reflection at the splice points.

Applications of photonic crystal fibres (or microstructured fibres) having voids filled with liquids or solid materials different from the silica base material (or other base material, e.g., chalcogenide or polymers), do, however, have much wider perspectives than described by prior art. One embodiment of an optical component according to the present invention is shown in FIG. 5, which illustrates a PCF 501, having voids 502 of which at least one is filled with a material different from the PCF base material. The PCF is spliced (or connected) to standard optical fibre 503 in one end of the device and likewise spliced to a standard optical fibre 504 at the opposite end of the device. By having a PCF with an active material in at least one of the voids, it becomes possible to provide active components such as fibre lasers operating at new wavelengths, or attenuators designed to specific spectral windows. It is important to note that due to the hybrid structure of the PCF of one base material and the active material placed in a different material, completely new properties concerning new spectral properties, new transverse mode distributions, and higher power levels become possible, because some of the previous material incompatibilities between active materials and fibre base materials have been lifted.

Figure 6:
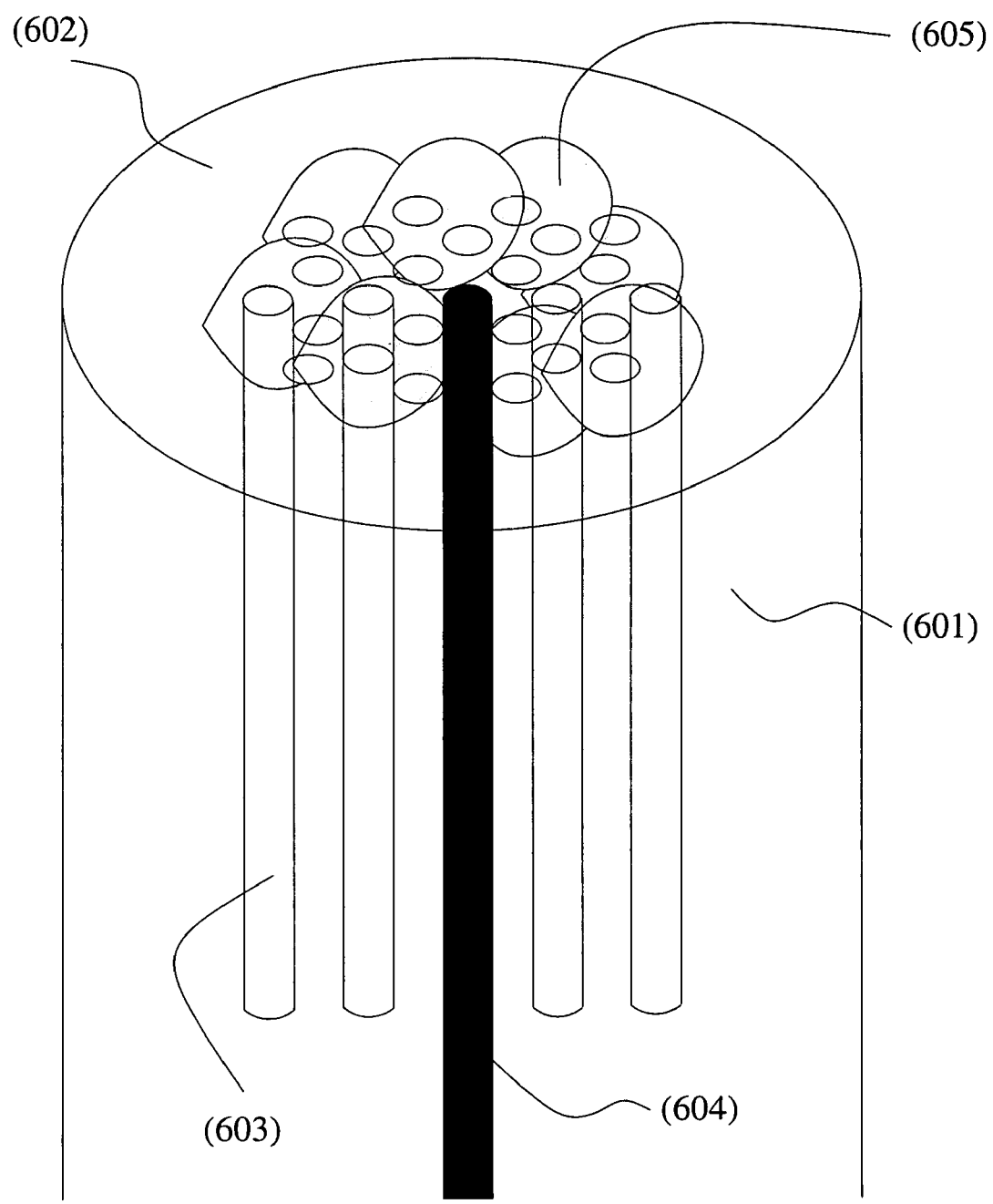
FIG. 6 illustrates how selective closing of individual holes of a photonic crystal fibre end-face may be carried previous to liquid filling.

The present inventors have realised that in contrast to prior art, a highly improved functionality of composite material photonic crystal fibres may be obtained if the active material only is placed selectively in the voids where optimal interaction with the optical fields may be obtained. An example of such a structure may be an optical amplifier having a 2-level or 3-level active material (e.g., such as erbium ions), which work as attenuators if not pumped by sufficiently strong optical pump power. In such a system, the preferred mode control may need numerous holes/voids, whereas the active material placed far from the maximum intensity pump mode distribution may work as performance degrading elements (lowering the obtainable optical gain). Selective filling of voids may also be highly relevant from the point of view that different optical properties are obtainable depending on the fact that a given void is filled with air or a liquid. We may, therefore, obtain even more efficient structures, using the combination of background material air-voids and filled voids. A method for selective filling of voids in PCFs is illustrated in FIG. 6, which shows a photonic crystal fibre 601. The end facet 602 of the PCF is shown at the top of the figure, and among the voids 603 only the centre void 604 is filled. This is made possible because the voids have been individually masked by masking elements 605 previous to the liquid filling process (e.g., see FIG. 4) employing micro positioning equipment.

Figure 7:
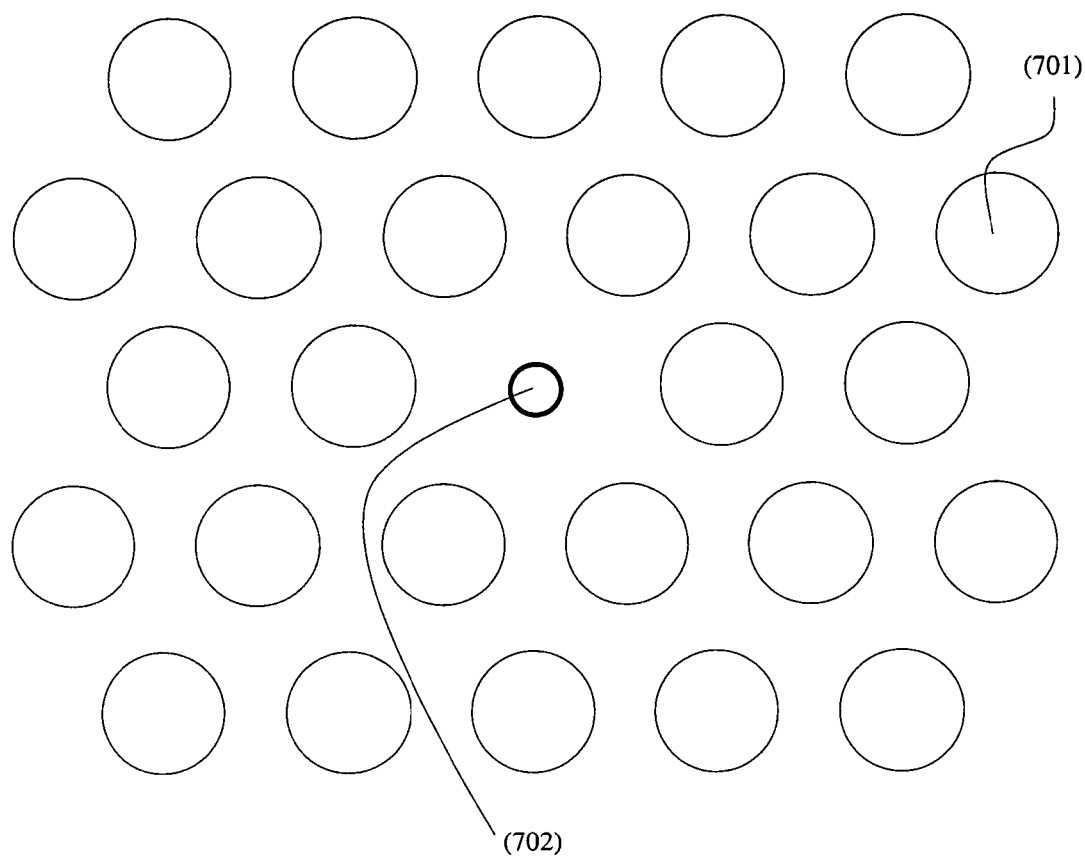
FIG. 7 illustrates a cross section of a photonic crystal fibre having the central element filled with a dye-solution or other active elements.

FIG. 7 illustrates a cross section of a PCF having air-voids 701 as a part of the waveguiding structure and a central, filled void 702. The central element will in general have a refractive index different from that of the air-voids, and the waveguiding may consequently be obtained as a result of the resulting structure. It is, therefore, also possible to have a structure with equal sized holes, and form the core simply by filling the active material into individual holes. This may also provide a feasible way to obtain multiple core structures. Means for filling selected holes are already indicated in FIG. 6, but will be further explained below.

Figure 8:
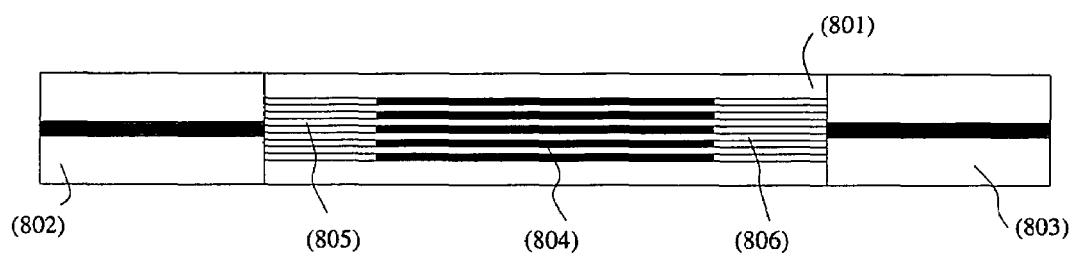
FIG. 8 schematically shows a fibre laser (or laser amplifier) having a central part of the laser cavity formed by a PCF in which liquid is filled in the holes in a section of the PCF.
Figure 9:
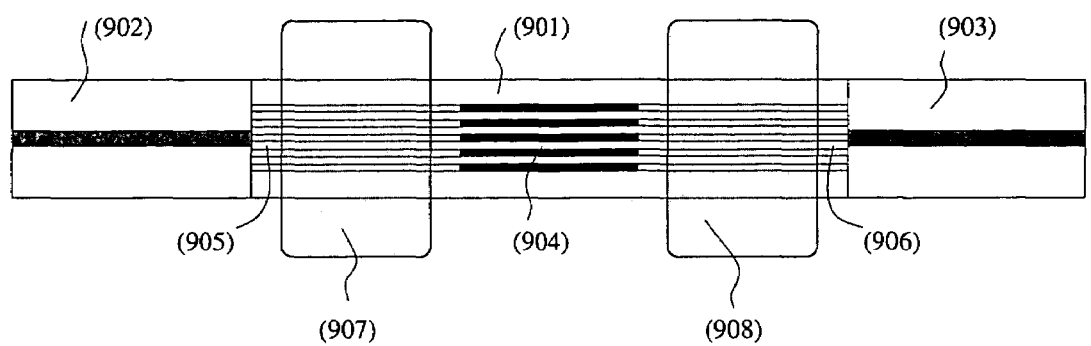
FIG. 9 shows a schematic example a tuneable liquid filled laser or amplifier cavity in which heaters/coolers are used to adjust the gas volumes surrounding the liquid filled part of the PCF, whereby the liquid strings are moved in longitudinal direction within the cavity.

One of the very interesting functionalities of the present invention is the formation of compact fibre lasers operating through the use of accurately confined liquid soluble active materials, exemplified by (but not limited to) a dye. An embodiment of such a laser (or amplifier) is shown in FIG. 8, which illustrates a photonic crystal fibre 801 spliced to two standard optical fibres 802 and 803. Within the PCF, a section (or certain part of the length) 804 of the voids are filled with a liquid in which the active material is dissolved, and the liquid filled section is surrounded by sections with air-filled voids 805 and 806 at both ends. It should be stressed that the present invention is not limited to the case of having all the voids within the liquid filled section 804 filled at equal length or necessarily having air-filled sections at both ends of the liquid-filled part. The embodiment illustrated in FIG. 8 allows for numerous optical properties depending on the mutual lengths of the sections L1, L2, and L3 (corresponding to 805, 804 and 806, respectively in FIG. 8). It is an interesting and useful property of the fibre laser (or amplifier) shown in FIG. 8 that depending on the lengths of the different sections, the overall transmission and reflection properties of the fibre component may be tuned. This is further outlined in FIG. 9, which shows a fibre laser (amplifier) equal to the one illustrated in FIG. 8. The device described in FIG. 9, consist of a PCF 901 spliced to one standard optical fibre 902 at one end and another standard optical fibre 903 at the other end. Note that the standard fibre sections need not to be identical. The three sections of the PCF, the one with air-filled voids 905, the one with liquid-filled voids 904, and the other with air-filled voids 905, do not need to be of equal length, neither do the different voids (j=1–Q) have to have equally long sections ($L_{fill,j}$) which are liquid-filled. The device illustrated in FIG. 9 is, furthermore, combined with heating or cooling devices 907 and 908, through which the liquid-filled section may be moved in longitudinal direction by controlling the individual temperature (and thereby the pressure) of the air-filled sections 905 and 906. Numerous embodiments of the lasers, amplifiers, or non-linear signal processing devices according to the invention may be envisioned including fibre devices with more sections of liquid-filled voids, separated by active or passive gasses, and having the individual section lengths arranged in periodical or non-periodical patterns, over long lengths etc. Furthermore, it should be noted that in combination with external temperature control, fibre lasers, which have self-adjusting capabilities, may also be realised according to the present invention. Here the local heating (or cooling) of an active section of the PCF could affect the surrounding gas-filled sections in such a manner that longitudinal adjustment and thereby power control is obtained.

The terms a 'section of the PCF' or a 'certain part of the length of the PCF' are used interchangeably when used in connection with the description of the part of the length of a PCF over which one or more voids of the PCF is/are fully or partially filled with a substance.

Figure 10:
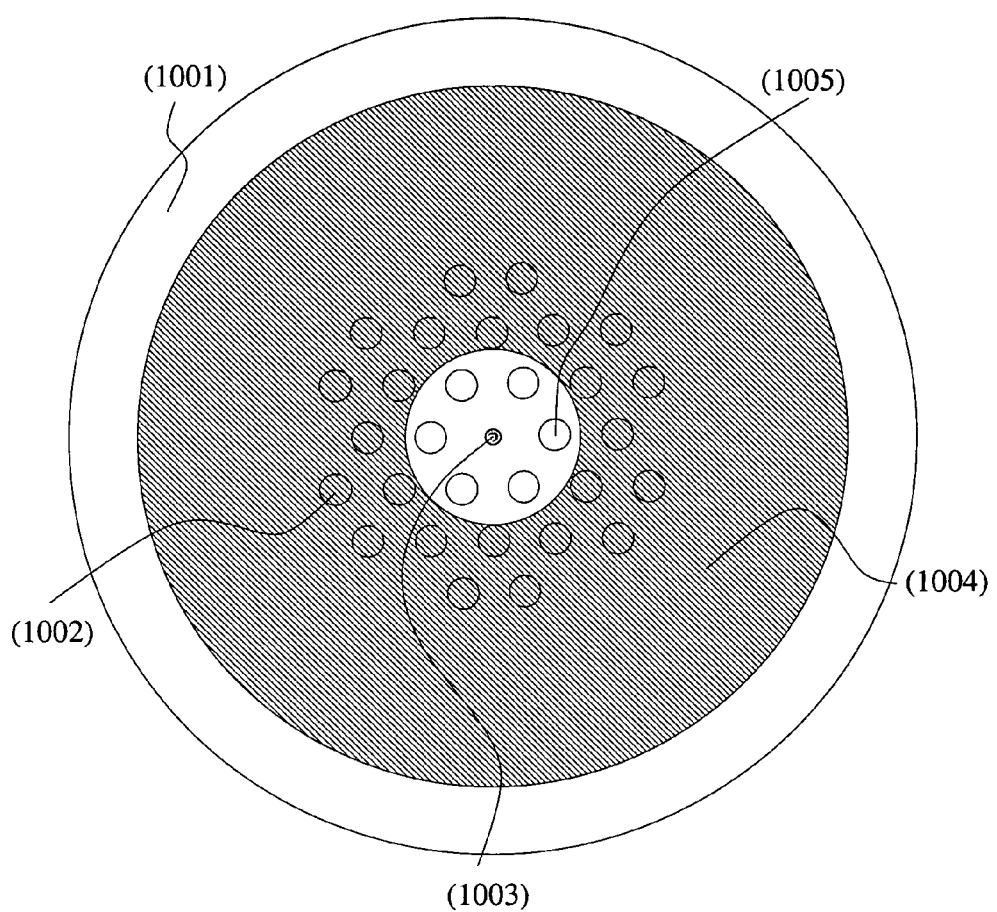
FIG. 10 schematically illustrates a transverse cross section that demonstrates, how the outer part of the cross section of a photonic crystal fibre may be shielded off by splicing thereon a fibre with a larger hollow section.

In order to obtain the optimal performance of composite material PCFs, it is advantageous to be able to fill individual (or a limited number of or a predetermined TBF-selection of) voids with a given active or waveguide modifying substance as discussed above, cf. FIGS. 4 and 6. Another method of doing so is schematically illustrated in FIG. 10, where a cross section of a photonic crystal fibre 1001 having a number of voids 1002 placed in the cladding, and a core 1003 in the centre of the PCF, is masked by a spliced-on fibre 1004 having a relatively large centre hole. If a liquid subsequently is administrated through the centre hole of the spliced-on fibre, the liquid will only have access to the inner (predetermined TBF-selection of) voids 1005 of the PCF. After the filling of the inner voids, the spliced-on fibre may be removed (cut-off) and the PCF may now be further processed.

Figure 11:
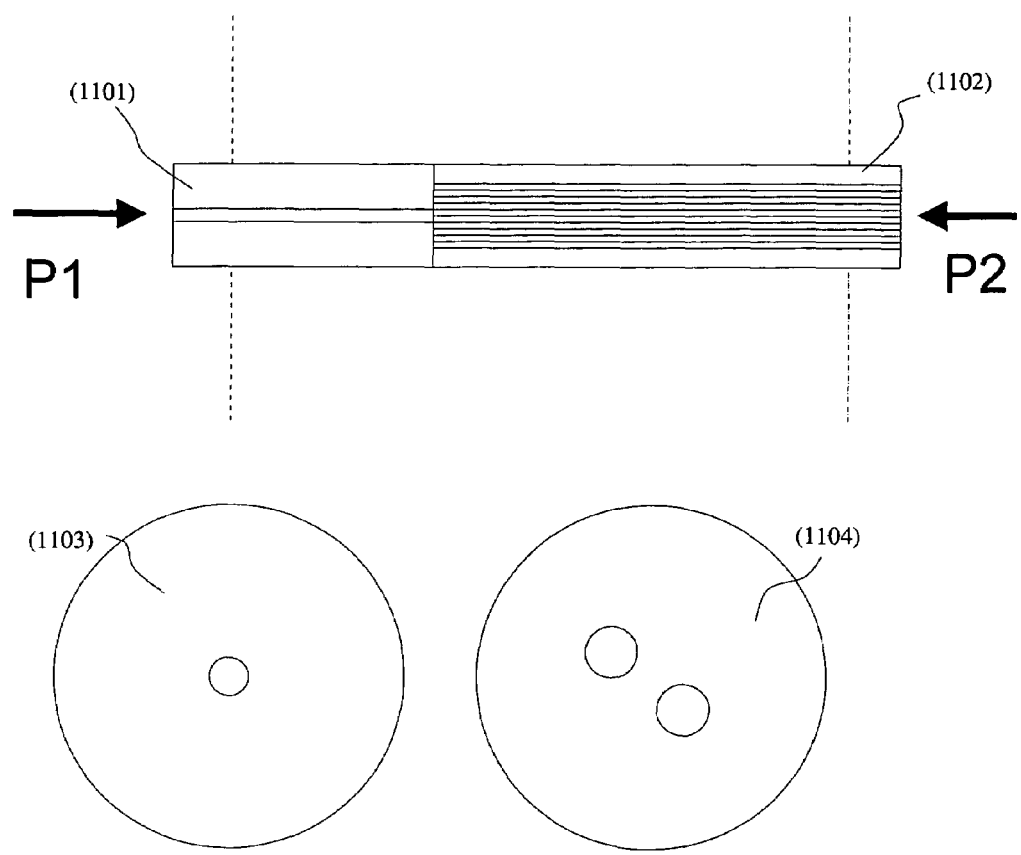
FIG. 11 schematically illustrates how selective access to a sub-group of holes may be obtained by splicing on masking fibres of different hole distribution.

Another embodiment of this method of individual filling of voids in PCFs may be seen from FIG. 11, which shows a fibre (or micro-tube) 1101 spliced onto a PCF 1102. The fibre 1101 shown at the left of FIG. 11 does generally not have an optical functionality, but is a masking tube through which different voids may be filled with liquids. Depending on the cross section of the masking fibre 1101, the centre part (as for cross section 1103) or non-centred sections 1104, which may e.g. be of specific interest for obtaining strongly birefringent devices, may be chosen. Note that the filling may be controlled by individual control of the pressure P1 and P2 indicated in FIG. 11.

Figure 12:
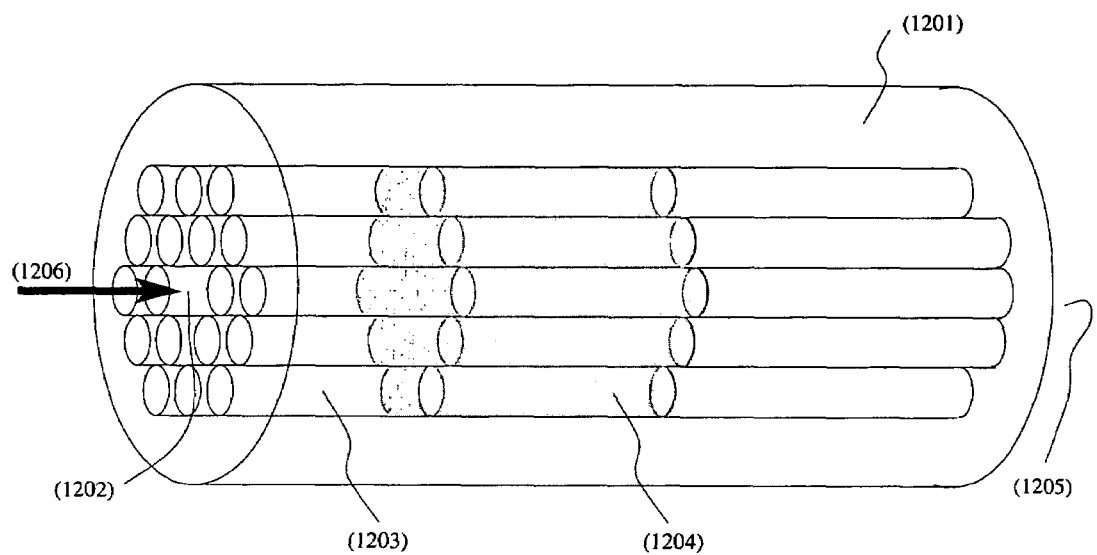
FIG. 12 schematically illustrates a multi-mode photonic crystal fibre structure with liquid-filled channels surrounding the core.
Figure 13:
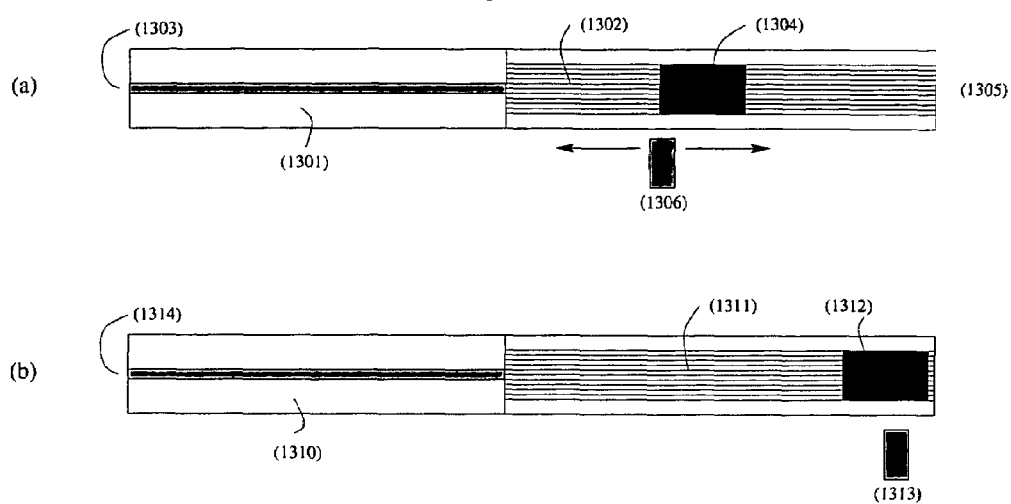
FIG. 13 shows a schematic illustration of a pressure or temperature sensor based on a liquid-filled photonic crystal fibre with light source and detector placement.

The idea of having liquid-filled sections in microstructured optical fibres is of pronounced relevance also for detection principles in optical sensors. These sensors may be constructed using single-mode as well as multi-mode fibres, and an interesting embodiment is illustrated in FIG. 12. In this example, a multi-mode photonic crystal fibre 1201 having a large area core section 1202 and a microstructured cladding section 1203, is used. If the air filling fraction of the cladding section 1203 is sufficiently large, a very high numerical aperture, e.g., NA>0.7, may generally be obtained. The PCF has a section (or certain part of the length of the PCF) of its voids filled with a liquid 1204 which strongly modifies the NA of the waveguide, resulting in a leakage of light through the sides of the waveguide, where the liquid filled section appear. By placing the tip of the fibre device in a measurement chamber 1205 and coupling light 1206 into the end of the fibre at the opposite end, the location of the leaking of light may indicate the pressure at the measurement point. This is further illustrated in FIG. 13.a, where a pressure sensor is schematically shown. The pressure sensor illustrated in FIG. 13.a consists of a standard fibre 1301 and a PCF 1302 spliced onto this. A light source 1303 is used to illuminate the end of the standard fibre (which may be a multi-mode fibre), and the liquid filled section 1304 may now be moved depending on the pressure at the measurement point 1305. The resulting longitudinal position of the liquid-filled section may be detected by measuring the signal from an optical detector 1306 placed at the side of the PCF. Actually a complete array of detectors along the length of the PCF may accurately indicate the position of the liquid-filled section and thereby provide a specific measurement of the pressure at the measurement point (possibly after making an initial calibration). A similar sensor principle may also be obtained for measurement of temperature (or the presence of liquids) as indicated in FIG. 13.b. Here a standard fibre 1310 is spliced onto a PCF 1311 and depending on the position (or presence) of a liquid filled section 1312 of the PCF, light is coupled from an optical light source 1313 into the core region of the PCF and further on to the detector 1314 at the end of the standard optical fibre.

Figure 14:
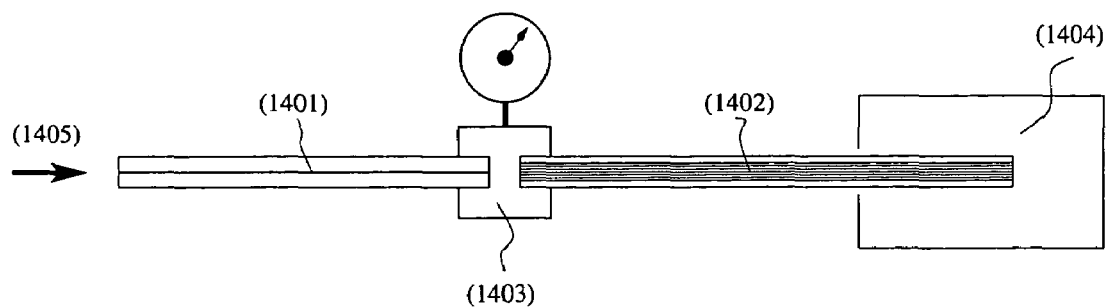
FIG. 14 illustrates the principle of how to fill or empty a photonic crystal fibre as a part of an optical sensor device.

FIG. 14 illustrates a device for extracting a very small volume of a liquid for spectroscopic measurements using a photonic crystal fibre device. The set-up consists of a standard optical fibre 1401, a section of a PCF 1402, a pressure control chamber 1403 and a container for the liquid under test 1404. Light 1405 may be sent into the test sample through the standard fibre, which also may be used to collect a reflected signal (e.g., by using a waveguide power splitter). Liquid is sucked into the fibre 1402 from the container holding the liquid 1404 by means of pressure controlled via the pressure chamber 1403. All or some of the liquid may be returned to the container holding the liquid by applying an overpressure from the pressure chamber.

Figure 15:
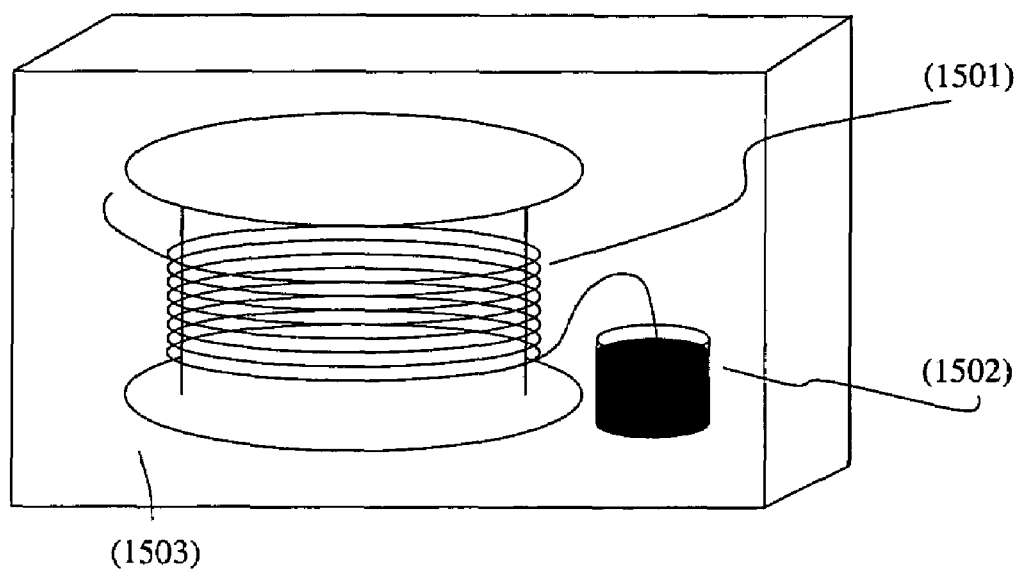
FIG. 15 illustrates how the capillary effect may be used to fill the holes of a PCF by a metal having a sufficiently low melting point to allow it on liquid form using an oven.

In the process of filling sections of the PCFs with other materials, it may be advantageous to use elevated temperatures for the process of filling the fibre voids. This is schematically indicated in FIG. 15, which shows a PCF 1501 wound on a coil and placed in a heated container (e.g. an oven) 1503 together with a liquid 1502 (or a melted material—e.g., a metal or a polymer). The liquid is introduced into the fibre by capillary action or by applying a pressure to the chamber 1503 using a combined pressure chamber and oven or by connecting one end of the fibre to an external pump.

Figure 16:
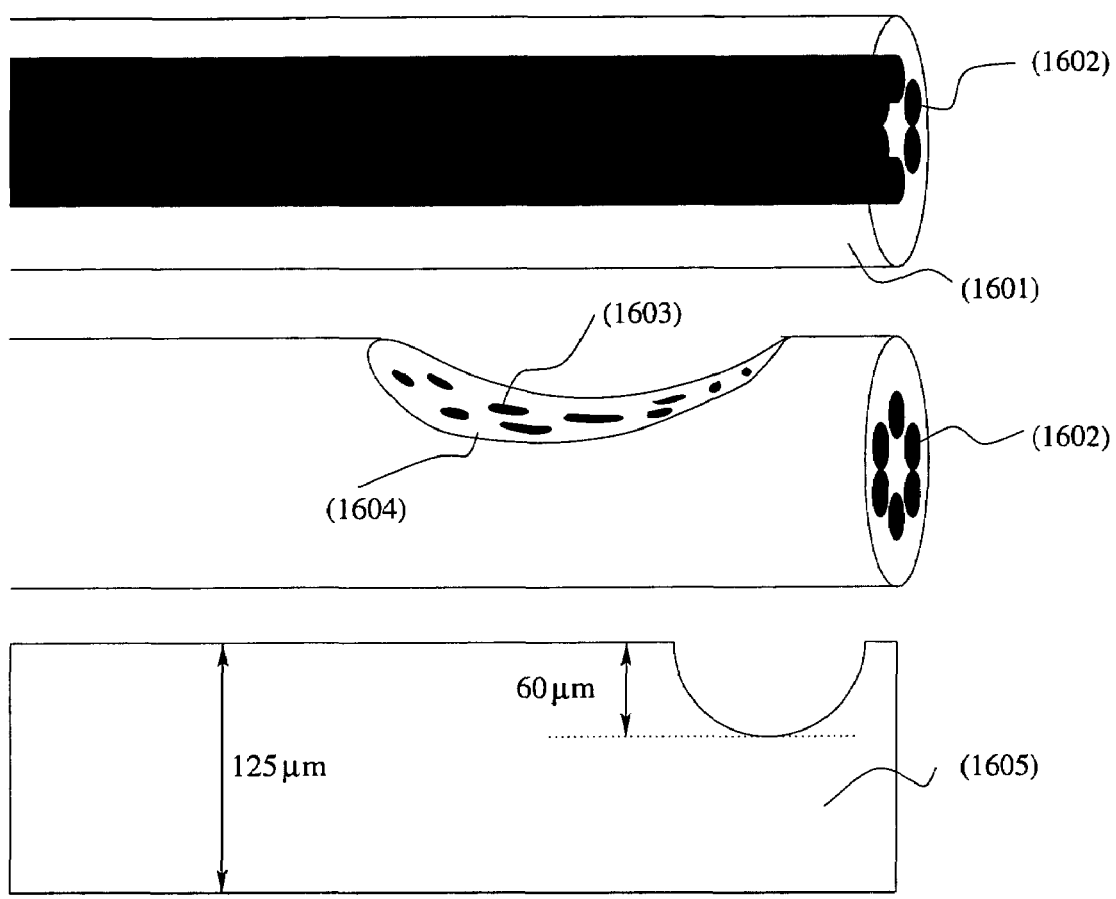
FIG. 16 schematically shows how access to the metal filled microchannels of a PCF may be obtained from the side of the fibre through polishing down the material.

In the process of filling the individual voids of a PCF, or just having access to these at a later point, another embodiment according to the present invention is shown in FIG. 16. The figure illustrate a PCF 1601 having voids 1602 filled with a material different from air (this material could be a metal or a polymer, but it could also be a material on liquid base). In order to gain access to a reasonably large part of the material in the void, e.g., if it was a metal that we wanted to apply a given voltage to (this could for instance be the case, if we wanted to use a poled fibre waveguide), a very efficient manner could be as illustrated in FIG. 16, where a part of the fibre has been polished down to access the voids from the side 1603 in a larger opening 1604 than is possible from the end of the fibre. A look at the fibre in a lengthwise (or longitudinal) cross section 1605 is also shown. The fibre may e.g. have a diameter of 125 μm and the fibre may be polished down to give access to voids running relatively close to the core, e.g. to a depth of 60 μm, depending on the dimension of the core region and the need for limiting the leakage from the polished surface.

Figure 17:
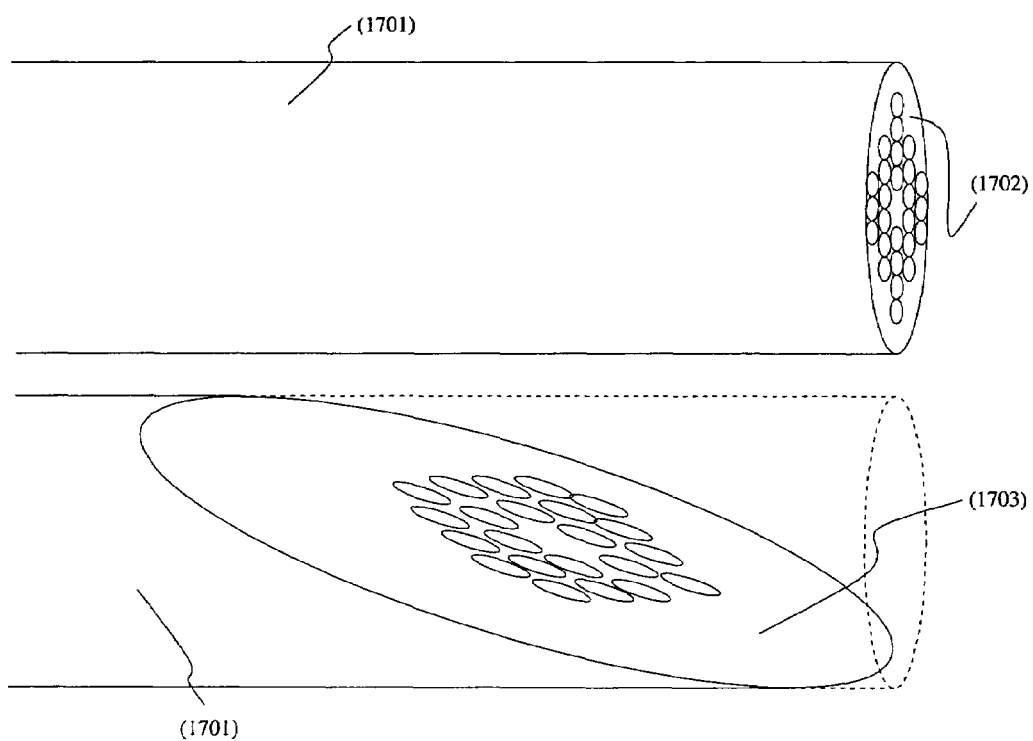
FIG. 17 illustrates how a higher hole separation for specific masking of individual holes may be obtained through angled cleaving or polishing of PCFs.

Yet another method to obtain larger access areas has been illustrated in FIG. 17, which shows a PCF 1701 that is cut to have an orthogonal cross section 1702 or a larger void area in the tilted cross section 1703 illustrated in the lower part of the figure.

Figure 18:
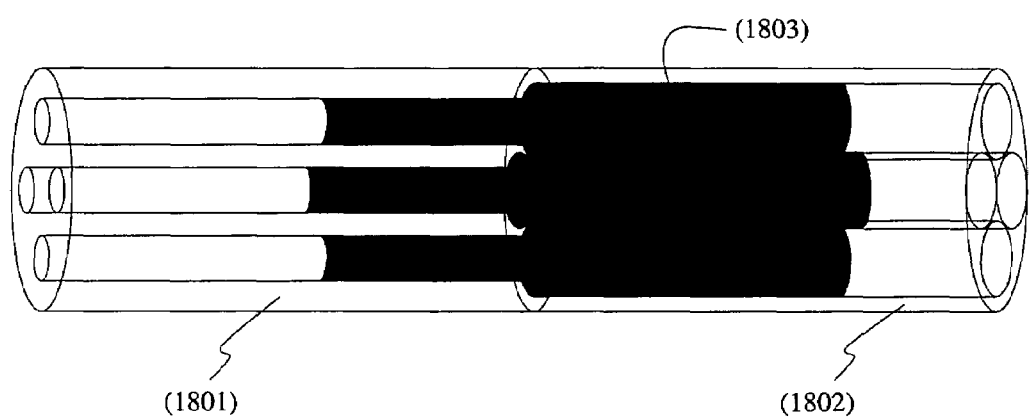
FIG. 18 shows how connected fibres with different hole diameters may be used to effectively change the total length of a liquid filled section of a PCF as an element of an optical amplifier-, laser-, or sensing system.

Another advantageous aspect of the invention described in this document is the possibilities of using liquid filled sections of PCF waveguides to obtain tuneable fibre light sources operating through non-linear processes. As described in the literature, the process of generating new optical frequencies through the non-linear processes of a PCF pumped by a short laser pulse, depends strongly on the effective area of the propagating mode as well as the waveguide dispersion. It is noteworthy that the non-linear processes, which are involved in continuum generation of light may take place over relatively short lengths of fibre, e.g., over a few centimetres. Through the use of moveable liquid strings in PCFs, it becomes possible to make fibre devices with tuneability concerning both effective mode area as well as waveguide dispersion. Methods of obtaining this kind of tuneability is illustrated in FIG. 18, where one type of PCF (1801) is spliced onto a PCF (1802) with different void dimensions. By moving the liquid filled string (1803) through the splicing section (e.g., using gas pressure as previously discussed) the effective length of the liquid filled section is modified, and the non-linear processes taking part in either the air-filled sections of the PCF or in the liquid-filled sections of the PCFs will, consequently, provide different optical output depending on the specific position of the liquid filled section. It will, therefore, be possible for a fibre device according to this description to tune the optical output spectrum for example by modifying the temperature of an external heater or cooler unit, but without changing the pump light.

Figure 19:
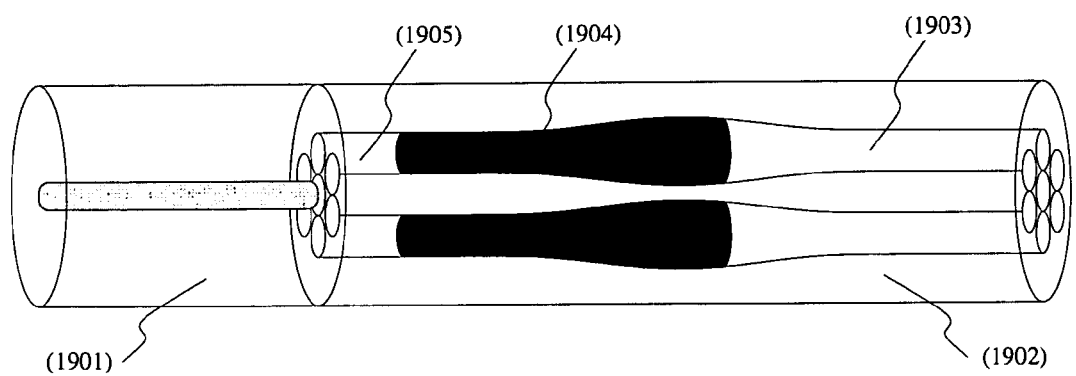
FIG. 19 illustrates a locally up-tapered section of a PCF having liquid filled holes over a certain part of the fibre, and in which the total length of the liquid string may be changed by actively moving the liquid string along the length of the PCF device.

FIG. 19 illustrates yet another embodiment of the tuneable non-linear fibre device as described in connection with FIG. 18. In FIG. 19 a standard optical fibre (1901) is spliced onto a PCF (1902), which has been treated to form a tapering of the void dimensions (1903). This may e.g. be done by heat treatment of the fibre combined with application of tensile or compressive forces to the fibre and/or pressurizing one or more of the voids. A section of (some or all of) the voids has been filled with a liquid (1904), and by modifying the temperature in the air-filled section (1905) the liquid may be longitudinally translated, and the waveguiding properties—and thereby the non-linear processes—may be modified, resulting in a spectrally tuneable fibre light source.

Figure 20:
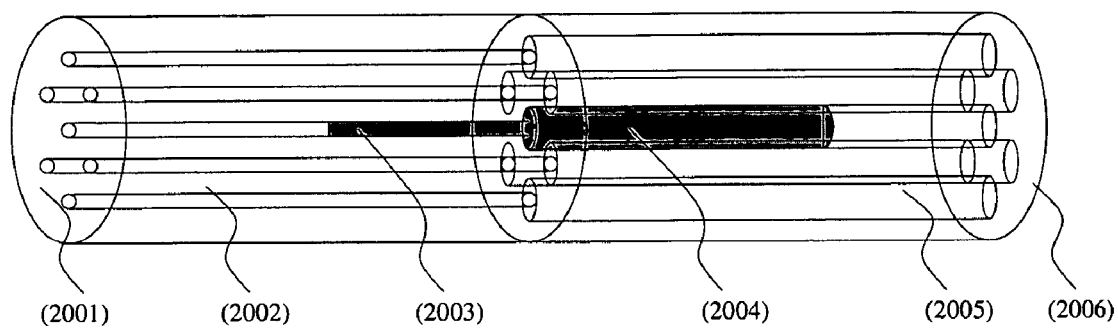
FIG. 20 shows a system in accordance with FIG. 18 where only a central void is filled with material over a certain part of the fibre(s).

FIG. 20 shows a system in accordance with FIG. 18 where only a central void is filled with material. The lengths (2002 and 2005) of air channels as well as the lengths of filled regions (2003 and 2004) are tunable by regulations of pressure at the end facets (2001 and 2006). It is noteworthy that regions 2002 and 2003 have hole diameters that differ from regions 2004 and 2005. Note that several different gasses, fluids, polymers, etc. may be present in any combination in void regions 2002, 2003, 2004, and 2005.

Figure 21:
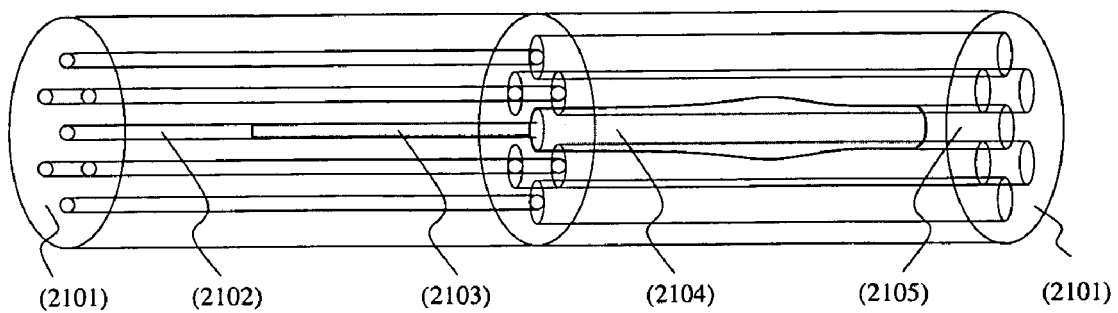
FIG. 21 shows a system related to FIG. 19 and FIG. 20 where a central tapered void is filled with material over a certain part of the length of the fibre(s).

FIG. 21 shows a system related to FIG. 19 and FIG. 20 where only a central void is filled and where pressure at end facet (2101) may modify lengths of air-filled voids (2102 and 2105) and thereby modify lengths of material-filled regions (2103 and 2104). It is noteworthy that regions 2102 and 2103 have hole diameters that differ from regions 2104 and 2105. Note that several different gasses, fluids, polymers, etc. may be present in any combination in void regions 2102, 2103, 2104, and 2105.

Figure 22:
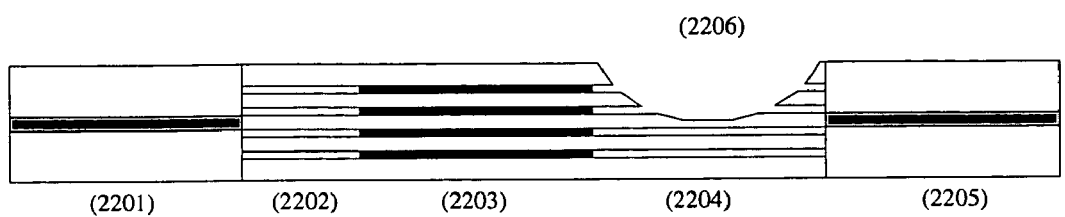
FIG. 22 shows a system in accordance with FIGS. 8 and 16 with an alternative access to the material of the voids.

FIG. 22 shows a system in accordance with FIG. 8 where pressure in one or more air or gas filled regions (2204 and 2202) may be used to modify lengths of sections filled with different matter (or substances). Only one access to voids 2204 is shown here, that is 2206. The system consists of standard fibers (2201 and 2205) connected to photonic crystal fibre that has longitudinal sections (2202, 2203, and 2204) of its holes filled with various materials, such as gain material, dye solution, Erbium solution, etc. Note that several different gasses, fluids, polymers, etc. may be present in any combination in void regions 2202, 2203, and 2204.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

The invention claimed is:

1. An optical fibre for transmission of light at a predetermined wavelength $\lambda_0$, the optical fibre having a longitudinal direction (z), a cross-section (r,$\phi$) perpendicular to the longitudinal direction, a length L and an outer periphery $r_{fibre}(\phi)$ in a cross section, the optical fibre comprising:

a core region, said core region having a centre axis in the longitudinal direction, said core region extending along and including said centre axis, said core region having an outer periphery $r_{core}(\phi)$, and a refractive index $n_{core}(r,\phi)$, and a geometrical index $n_{g,core}$ in a cross-section of the fibre;

an inner cladding region, said inner cladding region extending along the longitudinal direction, said inner cladding region surrounding and neighbouring said core region, said inner cladding region having an inner periphery $r_{iclad,inner}(\phi)$, that coincides with $r_{core}(\phi)$ and an outer periphery $r_{iclad,outer}(\phi)$ and a refractive index $n_{iclad}(r,\phi)$ and a geometrical index $n_{g,iclad}$ in said cross-section of the fibre, said inner cladding region including N spaced apart voids, said voids being located in a background material and extending in the longitudinal direction, each void having a centre and an outer periphery $r_{void,i}(\phi)$, i=1–N, in a cross-section of the fibre, and wherein N is larger than one; and an outer cladding region, said outer cladding region extending along the longitudinal direction and enclosing said inner cladding region, said outer cladding region having an inner periphery $r_{oclad,inner}(\phi)$ that coincides with said outer periphery $r_{iclad,outer}(\phi)$ of said inner cladding region and a refractive index $n_{oclad}(r,\phi)$ and a geometrical refractive index $n_{g,oclad}$ in a cross-section of the fibre, wherein $n_{g,oclad} < n_{g,core}$ and wherein a predetermined TBF-selection of Q of said voids over a certain part $L_{fill,j}$ extending between $z_{fill,j-2}$ and $z_{fill,j-1}$ of the length L of said fibre contains a substance, said substance-containing voids having a refractive index $n_{void,fill,j}(r,\phi)$, j=1–Q in a cross-section of the fibre, Q being less than the total number of voids N, and wherein said substance, at least for one void, is filling said void over only a part $L_{fill,j}$ of the length L of said fibre, where $L_{fill,j} < L$.

2. The optical fibre according to claim 1, wherein the core region comprises one or more voids.

3. The optical fibre according to claim 1, wherein the core region comprises a central void.

4. The optical fibre according to claim 1, wherein the core region comprises a central void surrounded by an annular segment.

5. The optical fibre according to claim 1, wherein the one or more voids are filled with a fluid substance.

6. The optical fibre according to claim 1, wherein K fluid substances are introduced into predetermined TBF-selections of said voids, so that fluid k is introduced in TBF-selection k and K is greater than one.

7. The optical fibre according to claim 1, wherein said substance includes optically active ions chosen from the group consisting of Ge, F, P, Sn, Bm, Er, Yb, Nd, La, Ho, Dy, Tm.

8. The optical fibre according to claim 1, wherein said substance comprises a dye.

9. The optical fibre according to claim 1, wherein the position of said substance in a longitudinal direction of the fibre may be controlled by means of an applied pressure at one end of the fibre.

10. A method of introducing a fluid substance into one or more voids of a length of TBF-micro-structured fibre, the optical fibre having a longitudinal direction (z), a cross-section (r,φ) perpendicular to the longitudinal direction, a length L and an outer periphery $r_{fibre}(\phi)$ in a cross section, the optical fibre including:

a core region, said core region having a centre axis in the longitudinal direction, said core region extending along and including said centre axis, said core region having an outer periphery $r_{core}(\phi)$, and a refractive index $n_{core}(r,\phi)$, and a geometrical index $n_{g,core}$ in a cross-section of the fibre;

an inner cladding region, said inner cladding region extending along the longitudinal direction, said inner cladding region surrounding and neighbouring said core region, said inner cladding region having an inner periphery $r_{iclad,inner}(\phi)$, that coincides with $r_{core}(\phi)$ and an outer periphery $r_{iclad,outer}(\phi)$ and a refractive index $n_{iclad}(r,\phi)$ and a geometrical index $n_{g,iclad}$ in said cross-section of the fibre, said inner cladding region including N spaced apart voids, said voids being located in a background material and extending in the longitudinal direction, each void having a centre and an outer periphery $r_{void,i}(\phi)$, i=1–N, in a cross-section of the fibre, and wherein N is larger than one, and an outer cladding region, said outer cladding region extending along the longitudinal direction and enclosing said inner cladding region, said outer cladding region having an inner periphery $r_{oclad,inner}(\phi)$ that coincides with said outer periphery $r_{iclad,outer}(\phi)$ of said inner cladding region and a refractive index $n_{oclad}(r,\phi)$ and a geometrical refractive index $n_{g,oclad}$ in a cross-section of the fibre;

wherein $n_{g,oclad} < n_{g,core}$, said fibre having a first and a second end and including N such voids, the voids extending in a longitudinal direction of the fibre over its full length, the method comprising the steps of:

preparing and fixing said first and second ends of the fibre;

identifying a TBF-selection of Q of said voids to be filled with a fluid substance over a certain part $L_{fill,j}$ extending between $Z_{fill,j-2}$ and $Z_{fill,j-1}$ of the length L of said fibre, Q being less than the total number of voids N;

identifying a NTBF-selection of N–Q voids that are not to be filled with said fluid substance;

providing the openings of said NTBF-selection of voids with a closely fitting masking element in said second end of the fibre; and infusing said fluid substance into said TBF-selection of voids from said second end of the fibre, said substance-containing voids having a refractive index $n_{void,fill,j}(r,\phi)$, j=1–Q in a cross-section of the fibre.

11. The method according to claim 10, wherein the masking element in the step of providing comprises a length of microstructured masking fibre, said masking fibre having a first and second end and including one or more voids extending in its longitudinal direction over its full length, said first end of said masking fibre being abutted with said second end of said TBF-microstructured fibre and so aligned therewith that the openings of said one or more voids of said first end of said masking fibre enclose at least one and preferably all of the openings of said TBF-selection of Q voids to be filled with said fluid substance and none of the openings of said NTBF-selection of N–Q voids that are not to be filled with said fluid substance.

12. The method according to claim 11, wherein the step of infusing is performed through said second end of said masking fibre.

13. The method according to claim 10, wherein the step of infusing is performed by immersing said second end of said TBF-microstructured fibre in said fluid substance and connecting said first end of said TBF-microstructured fibre to a pump and activating the pump so that said fluid substance is sucked into one or preferably all of said TBF-selection of Q voids.

14. The optical fibre according to claim 1 as an active microstructured fibre in a fibre laser or amplifier, said active microstructured fibre having a first and a second end and first and second reflective elements, said active microstructured fibre comprising N voids, the voids extending in a longitudinal direction of the fibre over its full length, wherein a predetermined TBF selection of Q of said voids over a certain part $L_{fill,j}$ of the length L of said fibre contains a substance, said substance comprising optically active materials, said first and second reflective elements and said voids comprising optically active materials defining a laser cavity, each end of said active microstructured fibre being connected to an optical waveguide for, respectively, entering light into and transmitting light from said laser cavity.

15. A fibre laser or amplifier, comprising a length L of active microstructured fibre according to an optical fibre for transmission of light at a predetermined wavelength $\lambda_0$, the optical fibre having a longitudinal direction (z), a cross-section (r,$\phi$) perpendicular to the longitudinal direction, a length L and an outer periphery $r_{fibre}(\phi)$ in a cross section, the optical fibre including:

a core region, said core region having a centre axis in the longitudinal direction, said core region extending along and including said centre axis, said core region having an outer periphery $r_{core}(\phi)$, and a refractive index $n_{core}(r,\phi)$, and a geometrical index $n_{g,core}$ in a cross-section of the fibre;

an inner cladding region, said inner cladding region extending along the longitudinal direction, said inner cladding region surrounding and neighbouring said core region, said inner cladding region having an inner periphery $r_{iclad,inner}(\phi)$, that coincides with $r_{core}(\phi)$ and an outer periphery $r_{iclad,outer}(\phi)$ and a refractive index $n_{iclad}(r,\phi)$ and a geometrical index $n_{g,iclad}$ in said cross-section of the fibre, said inner cladding region including N spaced apart voids, said voids being located in a background material and extending in the longitudinal direction, each void having a centre and an outer periphery $r_{void,i}(\phi)$, i=1–N, in a cross-section of the fibre, and wherein N is larger than one; and an outer cladding region, said outer cladding region extending along the longitudinal direction and enclosing said inner cladding region, said outer cladding region having an inner periphery $r_{oclad,inner}(\phi)$ that coincides with said outer periphery $r_{iclad,outer}(\phi)$ of said inner cladding region and a refractive index $n_{oclad}(r,\phi)$ and a geometrical refractive index $n_{g,oclad}$ in a cross-section of the fibre;

wherein $n_{g,oclad} < n_{g,core}$ and wherein a predetermined TBF-selection of Q of said voids over a certain part $L_{fill,j}$ extending between $z_{fill,j-2}$ and $z_{fill,j-1}$ of the length L of said fibre contains a substance, said substance-containing voids having a refractive index $n_{void,fill,j}(r,\phi)$, j=1–Q in a cross-section of the fibre, Q being less than the total number of voids N, and wherein said substance, at least for one void, is filling said void over only a part $L_{fill,j}$ of the length L of said fibre, where $L_{fill,j} < L$.

16. The fibre laser or amplifier according to claim 15, wherein said substance is a liquid, and the fibre laser or amplifier further comprises at each end of said active microstructured fibre an element for modifying the pressure inside the substance-containing voids of the active microstructured fibre.

17. An optical pressure sensor comprising a light source feeding light into a first end of an optical waveguide, and a length L of a sensing micro-structured fibre according to an optical fibre for transmission of light at a predetermined wavelength $\lambda_0$, the optical fibre having a longitudinal direction (z), a cross-section (r,$\phi$) perpendicular to the longitudinal direction, a length L and an outer periphery $r_{fibre}(\phi)$ in a cross section, the optical fibre including:

a core region, said core region having a centre axis in the longitudinal direction, said core region extending along and including said centre axis, said core region having an outer periphery $r_{core}(\phi)$, and a refractive index $n_{core}(r,\phi)$, and a geometrical index $n_{g,core}$ in a cross-section of the fibre;

an inner cladding region, said inner cladding region extending along the longitudinal direction, said inner cladding region surrounding and neighbouring said core region, said inner cladding region having an inner periphery $r_{iclad,inner}(\phi)$, that coincides with $r_{core}(\phi)$ and an outer periphery $r_{iclad,outer}(\phi)$ and a refractive index $n_{iclad}(r,\phi)$ and a geometrical index $n_{g,iclad}$ in said cross-section of the fibre, said inner cladding region including N spaced apart voids, said voids being located in a background material and extending in the longitudinal direction, each void having a centre and an outer periphery $r_{void,i}(\phi)$, i=1–N, in a cross-section of the fibre, and wherein N is larger than one; and an outer cladding region, said outer cladding region extending along the longitudinal direction and enclosing said inner cladding region, said outer cladding region having an inner periphery $r_{oclad,inner}(\phi)$ that coincides with said outer periphery $r_{iclad,outer}(\phi)$ of said inner cladding region and a refractive index $n_{oclad}(r,\phi)$ and a geometrical refractive index $n_{g,oclad}$ in a cross-section of the fibre;

wherein $n_{g,oclad} < n_{g,core}$, said sensing micro-structured fiber having a first end and a second end, said first end of said sensing micro-structured fibre being connected to a second end of said optical waveguide, said N voids of said sensing micro-structured fibre extending in a longitudinal direction of the fibre over its full length, wherein a predetermined TBF-selection of Q of said voids over a certain part $L_{fill,j}$ of the length L of said fibre contains a fluid substance, said individual lengths of fluid substance in said Q voids being of substantially identical length $L_{fill}$ and being aligned in the longitudinal direction, said fluid containing voids having a refractive index $n_{void,fill,j}(r,\phi)$, j=1–Q in a cross-section of the fibre, said predetermined TBF-selection of voids and said refrative index $n_{void,fill,j}$ being adapted to provide a detectable leakage of light in a radial direction from said fibre over the length $L_{fill}$ said leakage of light being detected by an optical detector.

18. A non-linear optical component for modifying a propagating mode comprising at least one length of microstructured optical fibre for transmission of light at a predetermined wavelength $\lambda_0$, the optical fibre having a longitudinal direction (z), a cross-section (r,$\phi$) perpendicular to the longitudinal direction, a length L and an outer periphery $r_{fibre}(\phi)$ in a cross section, the optical fibre including:

a core region, said core region having a centre axis in the longitudinal direction, said core region extending along and including said centre axis, said core region having an outer periphery $r_{core}(\phi)$, and a refractive index $n_{core}(r,\phi)$, and a geometrical index $n_{g,core}$ in a cross-section of the fibre;

an inner cladding region, said inner cladding region extending along the longitudinal direction, said inner cladding region surrounding and neighbouring said core region, said inner cladding region having an inner periphery $r_{iclad,inner}(\phi)$, that coincides with $r_{core}(\phi)$ and an outer periphery $r_{iclad,outer}(\phi)$ and a refractive index $n_{iclad}(r,\phi)$ and a geometrical index $n_{g,iclad}$ in said cross-section of the fibre, said inner cladding region including N spaced apart voids, said voids being located in a background material and extending in the longitudinal direction, each void having a centre and an outer periphery $r_{void,i}(\phi)$, i=1–N, in a cross-section of the fibre, and wherein N is larger than one; and an outer cladding region, said outer cladding region extending along the longitudinal direction and enclosing said inner cladding region, said outer cladding region having an inner periphery $r_{oclad,inner}(\phi)$ that coincides with said outer periphery $r_{iclad,outer}(\phi)$ of said inner cladding region and a refractive index $n_{oclad}(r,\phi)$ and a geometrical refractive index $n_{g,oclad}$ in a cross-section of the fibre;

wherein $n_{g,oclad} < n_{g,core}$ and wherein a predetermined TBF-selection of Q of said voids over a certain part $L_{fill,j}$ extending between $Z_{fill,j-2}$ and $z_{fill,j-1}$ of the length L of said fibre contains a substance, said substance-containing voids having a refractive index $n_{void,fill,j}(r,\phi)$, j=1–Q in a cross-section of the fibre, said at least one length of microstructured fibre including one or more voids extending in a longitudinal direction of said fibre, wherein one or more of said voids contain a fluid substance, where the cross sectional area of said one or more fluid filled voids changes over its length.

19. The optical component according to claim 18, wherein said one or more voids comprising a fluid substance have a tapered cross section.

20. The optical component according to claim 18, comprising two abutted sections of microstructured optical fibre, having the same outer diameter and each comprising voids having identical centres in the abutted cross sections, wherein the one or more voids comprising a fluid substance have different cross sectional areas.

21. The optical component according to claim 18, wherein a standard optical fibre is spliced to one end of a length of microstructured fibre.

22. An optical component comprising at least one length of microstructured optical fibre for transmission of light at a predetermined wavelength $\lambda_0$, the optical fibre having a longitudinal direction (z), a cross-section (r,$\phi$) perpendicular to the longitudinal direction, a length L and an outer periphery $r_{fibre}(\phi)$ in a cross section, the optical fibre including:

a core region, said core region having a centre axis in the longitudinal direction, said core region extending along and including said centre axis, said core region having an outer periphery $r_{core}(\phi)$, and a refractive index $n_{core}(r,\phi)$, and a geometrical index $n_{g,core}$ in a cross-section of the fibre;

an inner cladding region, said inner cladding region extending along the longitudinal direction, said inner cladding region surrounding and neighbouring said core region, said inner cladding region having an inner periphery $r_{iclad,inner}(\phi)$, that coincides with $r_{core}(\phi)$ and an outer periphery $r_{iclad,outer}(\phi)$ and a refractive index $n_{iclad}(r,\phi)$ and a geometrical index $n_{g,iclad}$ in said cross-section of the fibre, said inner cladding region including N spaced apart voids, said voids being located in a background material and extending in the longitudinal direction, each void having a centre and an outer periphery $r_{void,i}(\phi)$, i=1–N, in a cross-section of the fibre, and wherein N is larger than one; and an outer cladding region, said outer cladding region extending along the longitudinal direction and enclosing said inner cladding region, said outer cladding region having an inner periphery $r_{oclad,inner}(\phi)$ that coincides with said outer periphery $r_{iclad,outer}(\phi)$ of said inner cladding region and a refractive index $n_{oclad}(r,\phi)$ and a geometrical refractive index $n_{g,oclad}$ in a cross-section of the fibre;

wherein $n_{g,oclad} < n_{g,core}$ and wherein a predetermined TBF-selection of Q of said voids over a certain part $L_{fill,i}$ extending between $Z_{fill,j-2}$ and $Z_{fill,j-1}$ of the length L of said fibre contains a substance, said substance-containing voids having a refractive index $n_{void,fill,j}(r,\phi)$, j=1–Q in a cross-section of the fibre, Q being less than the total number of voids N, and wherein said substance, at least for one void, is filling said void over only a part $L_{fill,j}$ of the length L of said fibre, where $L_{fill,j} < L$, said at least one length of microstructured fibre including one or more voids extending in a longitudinal direction of said fibre, wherein access to said voids is improved by providing the fibre with at least one oblique surface.

\* \* \* \* \*